(12) United States Patent
Mahlmeister et al.

(10) Patent No.: US 9,687,730 B2
(45) Date of Patent: Jun. 27, 2017

(54) GAMING DEVICE WITH INDEPENDENT GESTURE-SENSITIVE AREAS

(71) Applicant: STEELSERIES ApS, Valby (DK)

(72) Inventors: Jeffrey Nicholas Mahlmeister, Chicago, IL (US); Bruce Hawver, Hawthorn Woods, IL (US); Jacob Wolff-Petersen, Richmond (GB); Kim Rom, San Francisco, CA (US); Francis Arnold Grever, Palatine, IL (US); Tino Soelberg, Copenhagen (DK)

(73) Assignee: STEELSERIES ApS, Frederiksberk (DK)

( * ) Notice: Subject to any disclaimer, the term of this patent is extended or adjusted under 35 U.S.C. 154(b) by 0 days.

(21) Appl. No.: 13/957,492

(22) Filed: Aug. 2, 2013

(65) Prior Publication Data

US 2015/0038231 A1    Feb. 5, 2015

Related U.S. Application Data

(60) Provisional application No. 61/792,519, filed on Mar. 15, 2013.

(51) Int. Cl.
*A63F 13/06* (2006.01)
*A63F 13/20* (2014.01)
(Continued)

(52) U.S. Cl.
CPC .............. *A63F 13/06* (2013.01); *A63F 13/21* (2014.09); *A63F 13/213* (2014.09); *A63F 13/428* (2014.09)

(58) Field of Classification Search
CPC ....................................... A63F 13/06
See application file for complete search history.

(56) References Cited

U.S. PATENT DOCUMENTS 6,071,194 A * 6/2000 Sanderson .............. A63F 13/06
345/168
6,348,911 B1    2/2002 Rosenberg et al.
(Continued)

FOREIGN PATENT DOCUMENTS

DE    102010030974 A1    3/2011
GB    2434228    7/2007
WO    2011/130755    10/2011

OTHER PUBLICATIONS

Osoinach, B. "Proximity Capacitive Sensor Technology for Touch Sensing Applications", 2008. Published by Freescale Semiconductor, Tempe, Arizona, pp. 1-12.*
(Continued)

*Primary Examiner* — Jason Skaarup
(74) *Attorney, Agent, or Firm* — Guntin & Gust, PLC; Douglas Schnabel

(57) ABSTRACT

A system that incorporates the subject disclosure may include, for example, a processor coupled to a memory storing instructions and to a near field sensor. Execution of the instructions can cause the processor to perform operations including defining a zone corresponding to a portion of an accessory comprising the sensor, detecting a gesture of an object in the zone by sensing the object with the sensor, determining that the gesture is a new gesture not previously associated with the zone and not previously associated with a gaming action controlling presentations produced by a gaming application, associating the gesture with the zone and with the gaming action, subsequently detecting the gesture in the zone, obtaining the gaming action associated with the gesture, and transmitting the gaming action to the gaming application. Other embodiments are disclosed.

18 Claims, 18 Drawing Sheets

(51) Int. Cl.
  *A63F 13/428* (2014.01)
  *A63F 13/213* (2014.01)
  *A63F 13/21* (2014.01)

(56) References Cited

U.S. PATENT DOCUMENTS

| | | | |
|---|---|---|---|
| 7,002,702 B1 | 2/2006 | Machida | |
| 7,383,327 B1 | 6/2008 | Tormasov | |
| 8,063,893 B2 | 11/2011 | Rosenberg et al. | |
| 8,143,982 B1 | 3/2012 | Lauder et al. | |
| 8,212,772 B2 | 7/2012 | Shahoian | |
| 8,264,310 B2 | 9/2012 | Ive et al. | |
| 8,264,465 B2 | 9/2012 | Grant et al. | |
| 8,313,379 B2 | 11/2012 | Ikeda et al. | |
| 8,378,979 B2 | 2/2013 | Frid et al. | |
| 8,418,085 B2 | 4/2013 | Snook et al. | |
| 8,436,821 B1 | 5/2013 | Plichta et al. | |
| 8,638,190 B1* | 1/2014 | Want | G06F 3/017 340/5.1 |
| 8,660,342 B2 | 2/2014 | Obrador et al. | |
| 8,867,013 B2 | 10/2014 | Krishnakumar et al. | |
| 8,913,021 B2* | 12/2014 | Elias | G06F 3/044 345/173 |
| 2001/0003713 A1 | 6/2001 | Willner et al. | |
| 2001/0011995 A1* | 8/2001 | Hinckley | A63F 13/06 345/156 |
| 2002/0052230 A1 | 5/2002 | Martinek et al. | |
| 2003/0063779 A1 | 4/2003 | Wrigley | |
| 2003/0220142 A1 | 11/2003 | Siegel et al. | |
| 2004/0219976 A1 | 11/2004 | Campbell et al. | |
| 2004/0229687 A1 | 11/2004 | Miyamoto et al. | |
| 2004/0261026 A1 | 12/2004 | Corson | |
| 2005/0183143 A1 | 8/2005 | Anderholm et al. | |
| 2005/0225530 A1* | 10/2005 | Evans | G06F 3/0238 345/156 |
| 2006/0148578 A1 | 7/2006 | Hayes et al. | |
| 2006/0152495 A1 | 7/2006 | Gombert et al. | |
| 2006/0211471 A1 | 9/2006 | Walker et al. | |
| 2006/0211494 A1 | 9/2006 | Helfer et al. | |
| 2007/0026935 A1 | 2/2007 | Wolf et al. | |
| 2007/0080934 A1 | 4/2007 | Chen et al. | |
| 2007/0218965 A1 | 9/2007 | Tilston et al. | |
| 2007/0259716 A1* | 11/2007 | Mattice et al. | 463/36 |
| 2008/0174550 A1* | 7/2008 | Laurila et al. | 345/158 |
| 2008/0214305 A1 | 9/2008 | Addington et al. | |
| 2008/0225041 A1 | 9/2008 | El Dokor et al. | |
| 2009/0054146 A1 | 2/2009 | Epstein et al. | |
| 2009/0085877 A1 | 4/2009 | Chang et al. | |
| 2009/0124387 A1 | 5/2009 | Perlman et al. | |
| 2009/0163272 A1 | 6/2009 | Baker et al. | |
| 2009/0183098 A1 | 7/2009 | Casparian et al. | |
| 2009/0189858 A1 | 7/2009 | Lev et al. | |
| 2009/0303204 A1* | 12/2009 | Nasiri et al. | 345/184 |
| 2010/0081505 A1 | 4/2010 | Alten et al. | |
| 2010/0113153 A1 | 5/2010 | Yen et al. | |
| 2011/0007021 A1* | 1/2011 | Bernstein | G06F 3/0416 345/174 |
| 2011/0014984 A1 | 1/2011 | Penman et al. | |
| 2011/0021272 A1 | 1/2011 | Grant et al. | |
| 2011/0034248 A1* | 2/2011 | Grever | A63F 13/06 463/36 |
| 2011/0065509 A1 | 3/2011 | Rom et al. | |
| 2011/0081969 A1 | 4/2011 | Ikeda et al. | |
| 2011/0191686 A1 | 8/2011 | Wolff-Petersen et al. | |
| 2011/0250967 A1 | 10/2011 | Kulas et al. | |
| 2012/0050180 A1* | 3/2012 | King | G06F 3/0416 345/173 |
| 2012/0071244 A1 | 3/2012 | Gillo et al. | |
| 2012/0223935 A1* | 9/2012 | Renwick | G06F 3/0488 345/419 |
| 2012/0313901 A1* | 12/2012 | Monson | G06F 3/0418 345/178 |
| 2012/0319989 A1* | 12/2012 | Argiro | G06F 3/041 345/174 |
| 2012/0323521 A1 | 12/2012 | De Foras et al. | |
| 2013/0016042 A1 | 1/2013 | Makinen et al. | |
| 2013/0057299 A1* | 3/2013 | Unterreitmayer | G01D 3/0365 324/629 |
| 2013/0077820 A1 | 3/2013 | Marais et al. | |
| 2013/0188866 A1 | 7/2013 | Obrador et al. | |
| 2013/0303281 A1* | 11/2013 | Argiro | A63F 13/02 463/31 |
| 2014/0129935 A1 | 5/2014 | Ovadia Nahon et al. | |
| 2014/0168100 A1* | 6/2014 | Argiro | G06F 3/0416 345/173 |
| 2014/0357372 A1* | 12/2014 | Garcia | A63F 13/22 463/37 |

OTHER PUBLICATIONS

"ControllerMate v4.6", OrderedBytes, 2012.
"GestIC Technology Design Center", [http://www.microchip.com/pagehandler/en_us/technology/gestic, Apr. 29, 2013, 1 page.
"GestIC Technology Design Center", [http://www.microchip.com/pagehandler/en-us/technology/gestic/gettingstarted.html], Apr. 29, 2013, 1 page.
"Leap Motion", [https://www.leapmotion.com/], Apr. 29, 2013, 6 pages.
"Near and Far Field", [http://en.wikipedia.org/wiki/Near_and_far_field], Wikipedia, May 2, 2013, 10 pages.
"Siri. Your Wish is its command.", http://www.apple.com/ios/siri/, Apr. 24, 2013.
Microsoft, "Xbox 360 Limited Edition Metallic Silver Wireless Controller", http://www.microsoftstore.com/store/msstore/en_US/pd/ThemeID.27509700/Xbox-360-Limited-Edition-Metallic-Silver-Wireless-Controller/productID.246602800, Mar. 19, 2013.
Sony, "PS3 DualShock 3 Wireless Controller", http://www.gamestop.com/ps3/accessories/ps3-dualshock-3-wireless-controller/69638, Mar. 19, 2013.

* cited by examiner

500

600

700

900

Gamer Hardware Statistics

| Weapon Type | Gamer | | | | |
|---|---|---|---|---|---|
| | Subs Invoked | Macros Invoked | Shots | Rapid Shots | Single Shots |
| Sniper rifle | Up/Dwn | Team chat | 14 | 4 | 10 |
| Machine gun | Left 1 button | Toggle B/w Machine Gun Sniper Rifle | 66 | 60 | 6 |
| Hand gun | Right 1 button | Call for air support | 10 | 6 | 4 |

FIG. 10

Gamer Performance Factors

| Weapon Type | Gamer | | | | | |
|---|---|---|---|---|---|---|
| | Misses | Non-kill hits | Kill hits | Avg hit rate | Loss of life rate | Comp Rating |
| Sniper rifle | 3 | 7 | 4 | 29% | 5% | Trailing |
| Machine gun | 36 | 12 | 18 | 33% | 27% | Leading |
| Hand gun | 5 | 2 | 3 | 30% | 80% | Near even |

GAMING DEVICE WITH INDEPENDENT GESTURE-SENSITIVE AREAS

PRIOR APPLICATION

The present application claims the benefit of priority to U.S. Provisional Application No. 61/792,519 filed Mar. 15, 2013.

FIELD OF THE DISCLOSURE

The subject disclosure relates generally to a gaming device for processing gamers' gestures.

BACKGROUND

It is common today for gamers to utilize more than one gaming accessory. This is especially true of gamers who play Massively Multiplayer On-line (MMO) games in a team or individual configuration. Gamers can have at their disposal accessories such as a keyboard, a general purpose gaming pad, a mouse, a gaming console controller, a headset with a built-in microphone to communicate with other players, a joystick, a computer display, or other common gaming accessories.

A gamer can frequently use a combination of these accessories in one game (e.g., headset, a keyboard, and mouse). Efficient management and utilization of these accessories can frequently impact a gamer's ability to compete.

Accessory management can also have utility in other disciplines which may not relate to gaming applications. Efficient use of accessories in these other disciplines can also be important to users.

BRIEF DESCRIPTION OF THE DRAWINGS

Reference will now be made to the accompanying drawings, which are not necessarily drawn to scale, and wherein:

FIGS. 10-11 depicts illustrative embodiments of gamer statistics; and

DETAILED DESCRIPTION

The subject disclosure describes, among other things, illustrative embodiments of accessories that detect gestures, and the processing of such gestures. Other embodiments are contemplated by the subject disclosure.

One embodiment of the subject disclosure can entail a system having a memory to store instructions, and a processor coupled to the memory and coupled to a near field sensor. Execution of the instructions by the processor can cause the processor to perform operations including defining a zone corresponding to a portion of an accessory comprising the near field sensor wherein the near field sensor detects objects in the zone, detecting a gesture of an object in the zone by sensing the object with the near field sensor, determining that the gesture is a new gesture not previously associated with the zone and not previously associated with a gaming action of a plurality of gaming actions that control presentations produced by a gaming application, associating the gesture with the zone and with the gaming action responsive to the determination, subsequently detecting the gesture in the zone, obtaining the gaming action associated with the gesture responsive to detecting the gesture, and transmitting the gaming action to the gaming application.

One embodiment of the subject disclosure can entail a method comprising receiving input by an accessory comprising a processor coupled to a near field sensor to define a zone corresponding to a portion of the accessory comprising the near field sensor wherein the near field sensor detects objects in the zone, sensing by the accessory a gesture performed by an object in the zone and in a vicinity of the accessory that is detectable by the near field sensor, determining by the accessory that when the gesture is sensed in the zone the gesture is associated with a gaming action that controls presentations produced by a gaming application, obtaining by the accessory the gaming action associated with the gesture responsive to sensing the gesture, and transmitting by the accessory the gaming action to the gaming application.

One embodiment of the subject disclosure can entail a machine-readable storage medium comprising instructions which, when executed by a processor, cause the processor to perform operations including sensing a gesture performed by an object in a zone wherein the object is in a vicinity of a sensor for detecting gestures, associating the gesture with a gaming action that controls presentations produced by a gaming application, sensing by way of the sensor a subsequent instance of the gesture in the zone while ignoring actions by the object outside of the zone, obtaining the gaming action associated with the gesture responsive to detecting the subsequent instance of the gesture in the zone, and providing the gaming action to the gaming application.

Figure 1A:
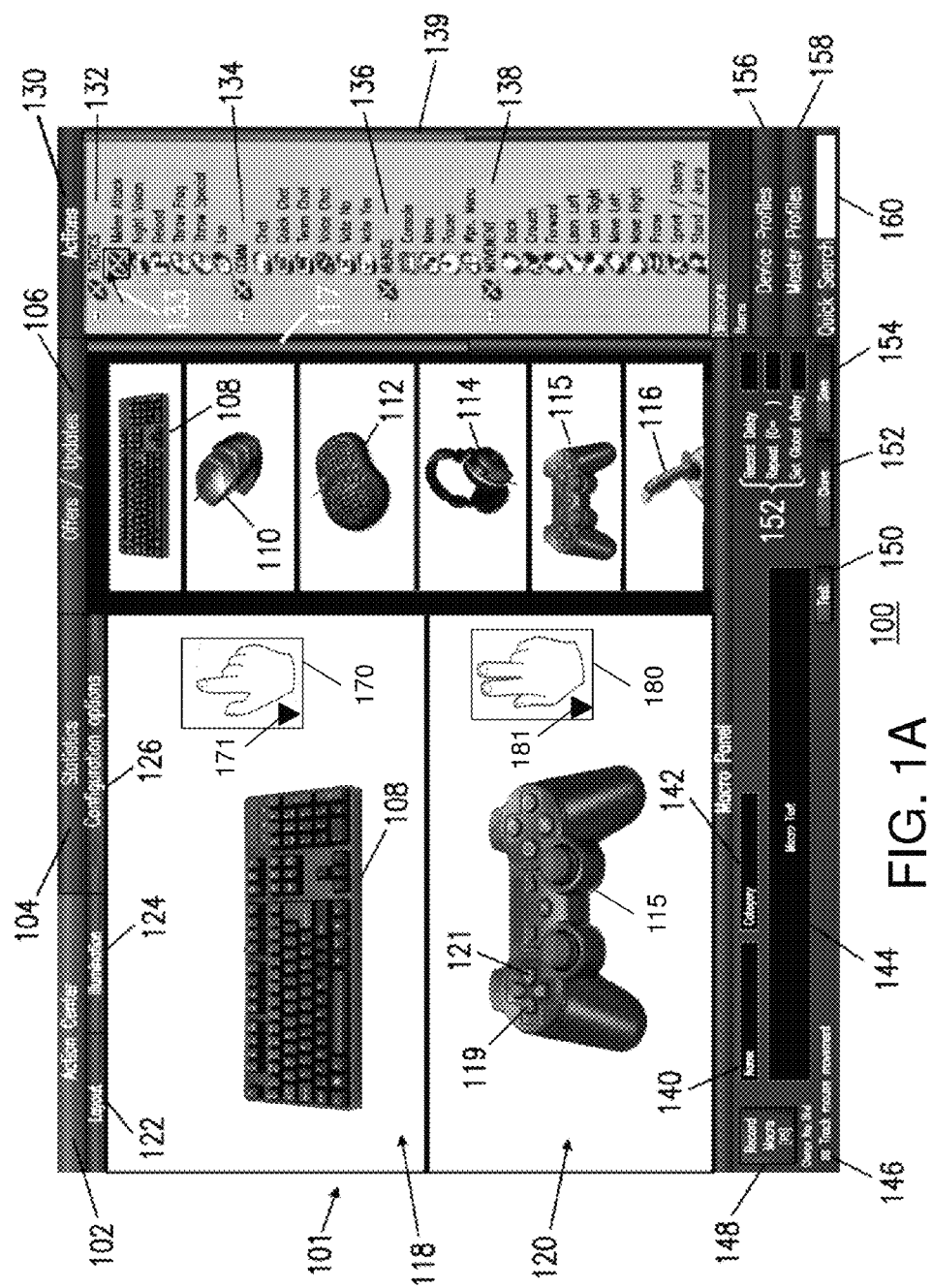
FIGS. 1A and 1B depict illustrative embodiments of a Graphical User Interface (GUI) generated by an Accessory Management Software (AMS) application according to the subject disclosure.

FIG. 1A depicts an illustrative embodiment of a Graphical User Interface (GUI) generated by an Accessory Management Software (AMS) application according to the subject disclosure. The AMS application can be executed by a computing device such as a desktop computer, a laptop computer, a server, a mainframe computer, a gaming console, a gaming accessory, or combinations or portions thereof. The AMS application can also be executed by portable computing devices such as a cellular phone, a smart phone, a tablet, a personal digital assistant, or a media player (such as an iPOD™-iPOD™ is a trademark of Apple Computer, Inc.). It is contemplated that the AMS application can be executed by any device with suitable computing resources. The operations of the AMS will be described below according to the illustrative embodiments of methods 500-700 of FIGS. 5-7.

Figure 2A:
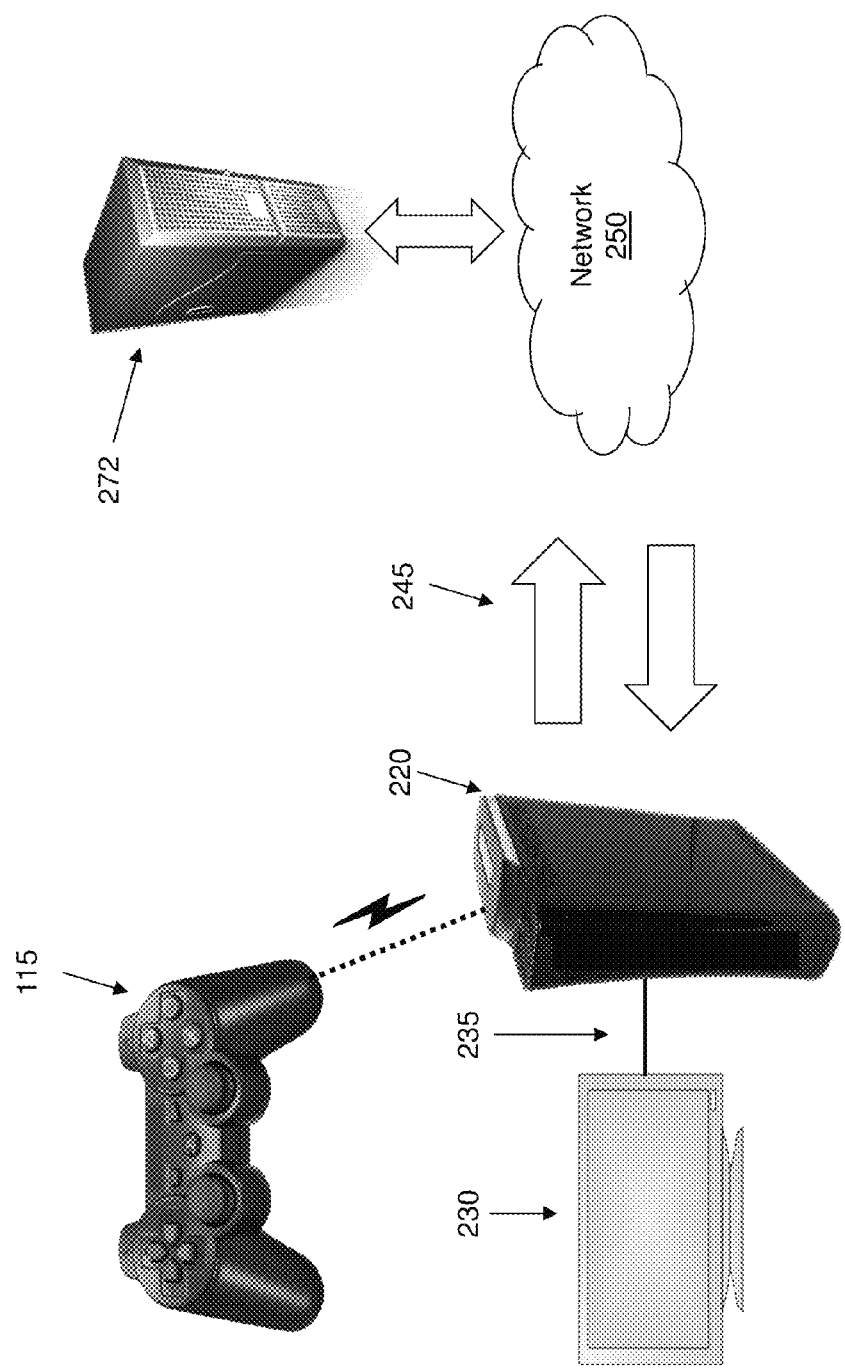
FIGS. 2A, 2B and 3 depict illustrative embodiments for communicatively coupling a gaming controller to a computing device.

FIG. 2A depicts a gaming controller 115 which can be used by a gamer, according to an embodiment of the subject disclosure. In this embodiment, gaming controller 115 and gaming console 220 have an integrated wireless interface for wireless communications therebetween (e.g., WiFi, Bluetooth®, ZigBee®, or proprietary protocol). Bluetooth® is a registered trademark of Bluetooth SIG, Inc, and ZigBee® is a registered trademark of the Zigbee Alliance. The gaming console 220 is coupled to network 250 via communication link 245, such as a WiFi link, to the internet. The gaming console 220 can be, for example, an Xbox™, a PS3™, a Wii™ or other suitable gaming console device (Xbox™ is a trademark of Microsoft Corporation, PS3™ is a trademark of Sony Corporation, and Wii™ is a trademark of Nintendo Corporation). Video information is displayed to the gamer on display device 230, which in this illustration is coupled to gaming console 220 by a wired connection 235 (e.g., HDMI connection). Display device 230 may be a television or a touch screen that serves both as an input device and an output device for experiencing a video game. Alternatively, the gaming controller 115 can be tethered to a computing device such as the gaming console by a cable (e.g., USB cable) to provide a means of communication that is less susceptible to electromagnetic or other sources of wireless interference.

Figure 2B:
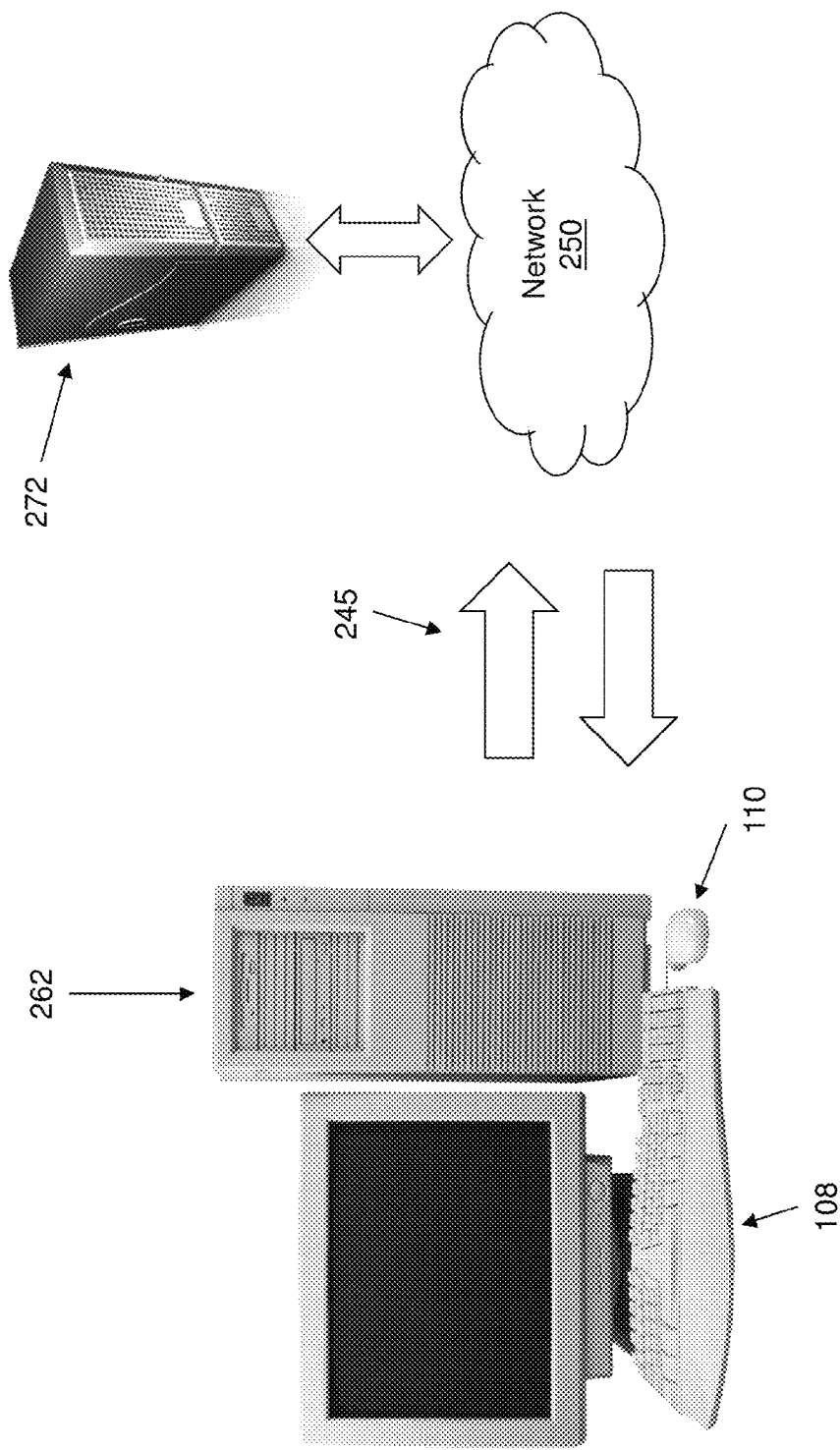

It is to be understood that the devices shown in FIG. 2A are merely illustrations of a wide variety of computing devices or other components that may be used in a video game, including an online game operated by an on-line gaming server 272. In another embodiment, shown in FIG. 2B, a desktop computer 262 can be used in place of the gaming console 220. In one embodiment, the desktop computer 262 can be configured to execute software that presents a localized game. In another embodiment, the desktop computer 262 can be configured to execute a gaming client (e.g., a software application) acting in cooperation with the on-line gaming server 272 accessible by the desktop computer 262 via the network 250 to present an on-line game (e.g., World of Warcraft™, which is a trademark of Blizzard Entertainment). The gaming accessory used with the desktop computer 262 can be a keyboard 108, a mouse 110, or another suitable gaming accessory device.

Figure 3:
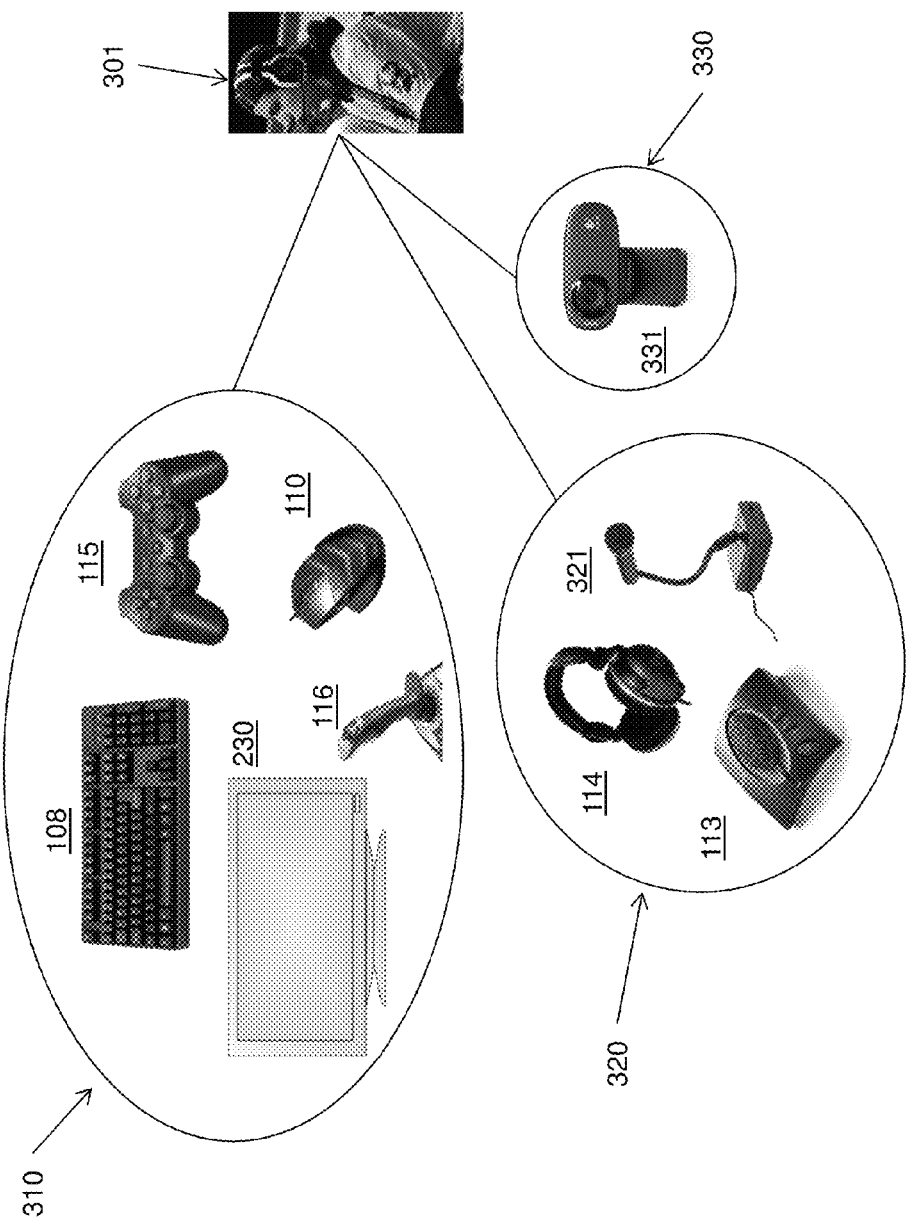

FIG. 3 illustrates gaming accessory devices with which a gamer 301 can interact. Touch-sensitive devices 310 can include a game controller 115, mouse 110, a keyboard 108, a display 230 (which may be touch-screen capable), and a joystick 116. Audio devices 320 can include headphones 114, a microphone 321, and a speakerphone 113. Imaging devices 330 can include a webcam 331. These accessory devices can provide sensory stimuli to the gamer, detect responses from the gamer, or both. The accessories can be coupled to the computing device by a tethered interface (e.g., USB cable), a wireless interface (e.g., Bluetooth or WiFi), or combinations thereof.

Figure 4:
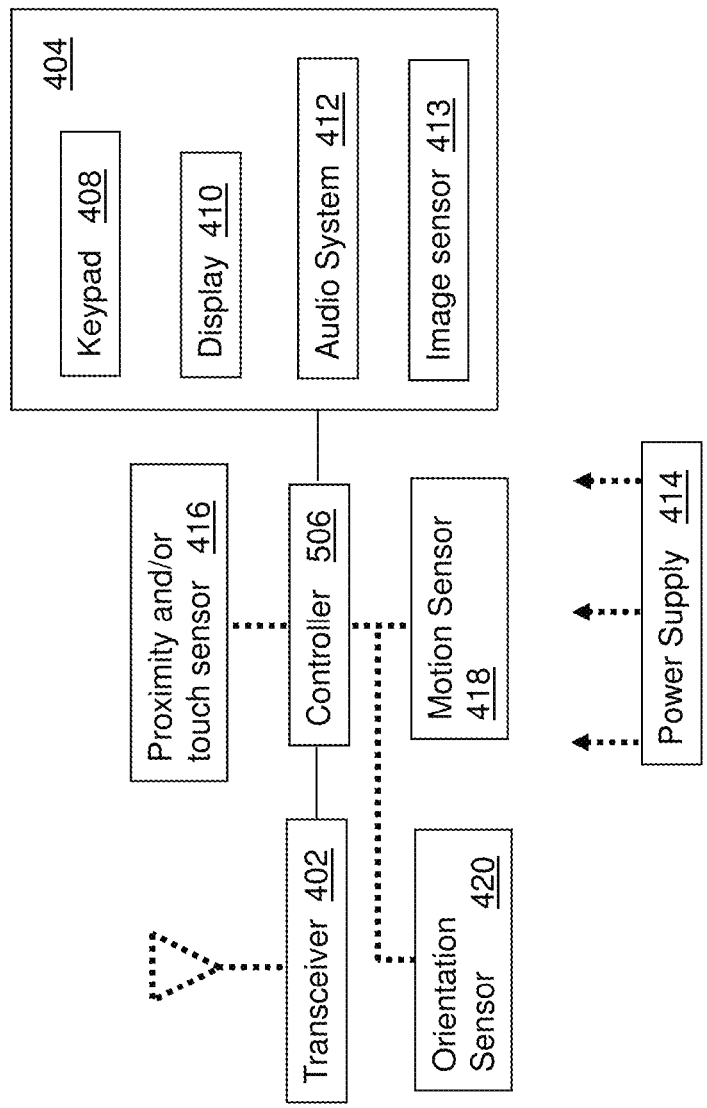
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 2-3. The communication device 400 can comprise a wireline and/or wireless transceiver 402 (herein transceiver 402), a user interface (UI) 404, a power supply 414, a proximity or touch sensor 416, a motion sensor 418, an orientation sensor 420, and a controller 406 for managing operations thereof. The transceiver 402 can support short-range or long-range wireless access technologies such as Bluetooth®, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 is touch-sensitive, a portion or all of the keypad 408 can be presented by way of the display 410 with navigation features (e.g., an iPad™, iPhone™, or Android™ phone or tablet). iPad™, iPhone™ are trademarks of Apple Computer, and Android™ is a trademark of Google Corporation. As a touch screen display, the communication device 400 can be adapted to present a user interface with graphical user interface (GUI) elements that can be selected by a user with a touch of a finger or fingers. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity or touch sensor 416 can utilize proximity and/or touch sensing technology such as an electromagnetic sensor, a capacitive sensor, an inductive sensor, a near-field sensor (using technology such as a GestIC™, a trademark of Microchip Technology, Inc.), an image sensor (using technology such as a LeapMotion Controller™, a trademark of LeapMotion, Inc), or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth®, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

All or a portion of the technologies described for communication device 400 can be integrated in accessories such as shown in FIGS. 5B-5G. For example, the proximity and/or touch sensor 416 can be integrated in each of the accessories shown in FIGS. 5B-5G. Accordingly, these accessories can detect touch and/or near field activities such as gestures (touching or proximate to the accessory) performed by a user. Furthermore, a plurality of sensors 416 can be integrated on a single accessory, so that different zones associated with the accessory detect different sets of gestures, as shown in FIGS. 5H-5M (each zone corresponding to a portion of the accessory and the space proximate thereto). Other technologies of the communication device 400 can be integrated in whole or in part in these accessories, such as the transceiver 402, controller 506, motion sensor 418, and so on.

Figure 5A:
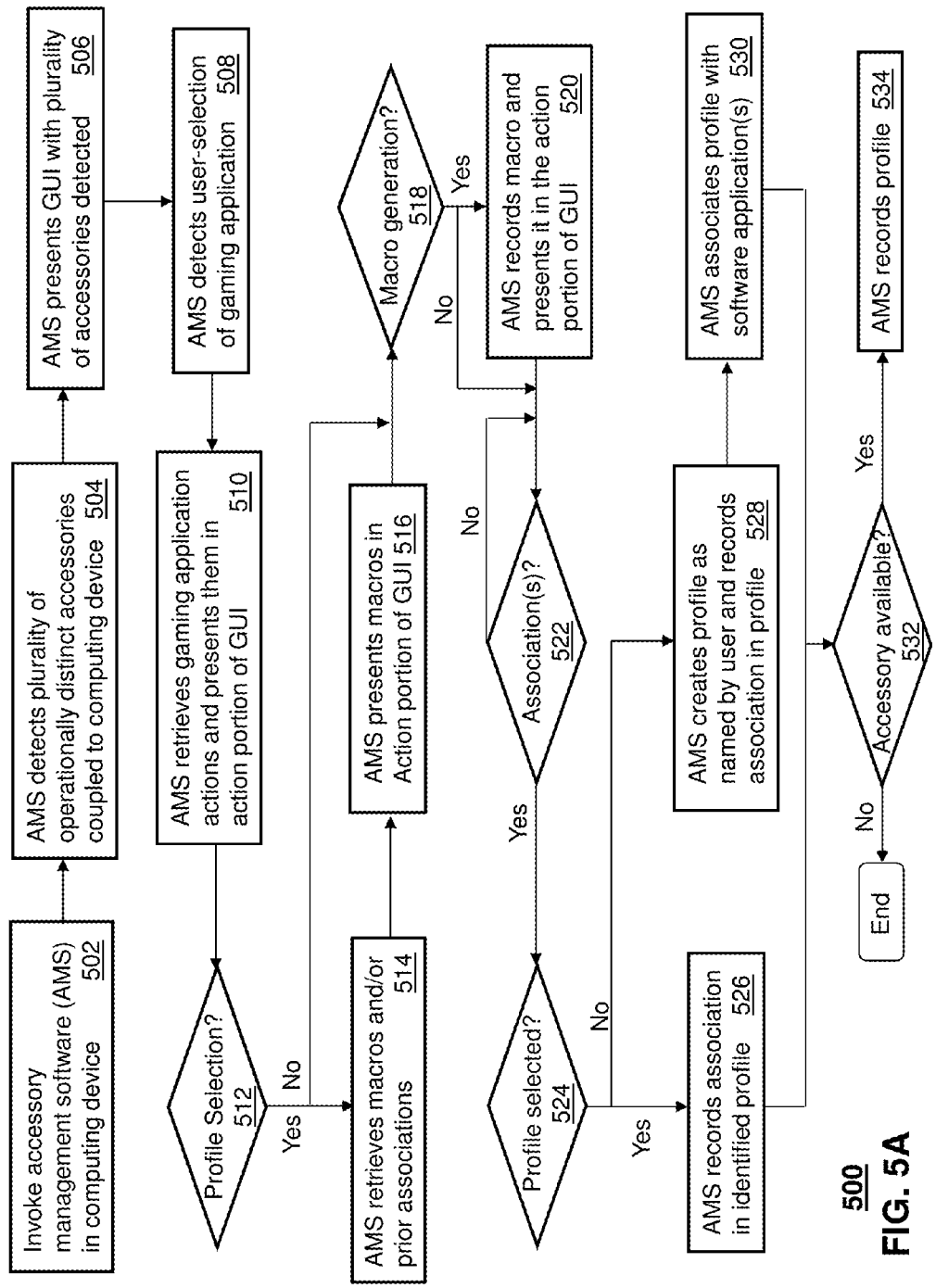
FIGS. 5A-5M depicts illustrative embodiments for configuring a gaming environment by way of the AMS application using gestures.
Figure 5D:
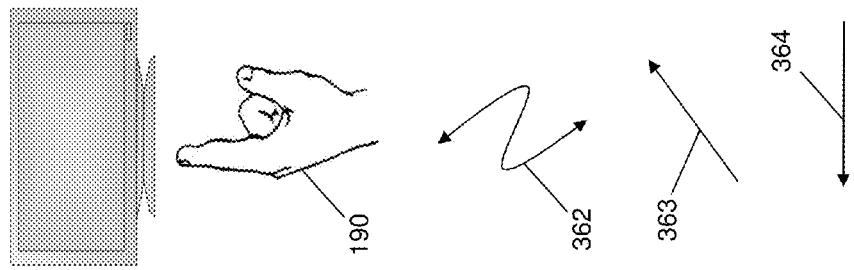
Figure 6:
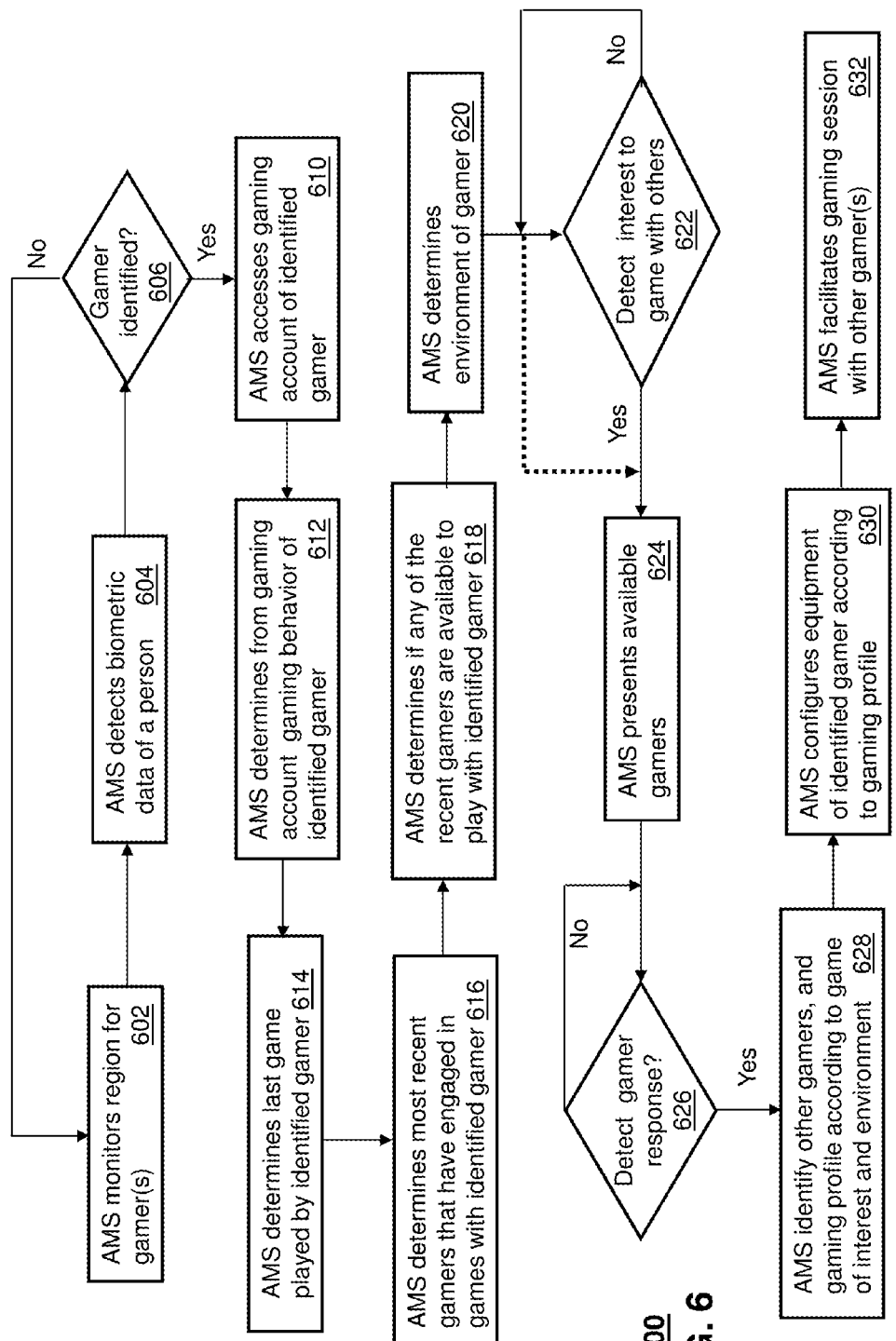
FIGS. 6-7 depicts illustrative embodiments for configuring a gaming environment by way of the AMS application.
Figure 7:
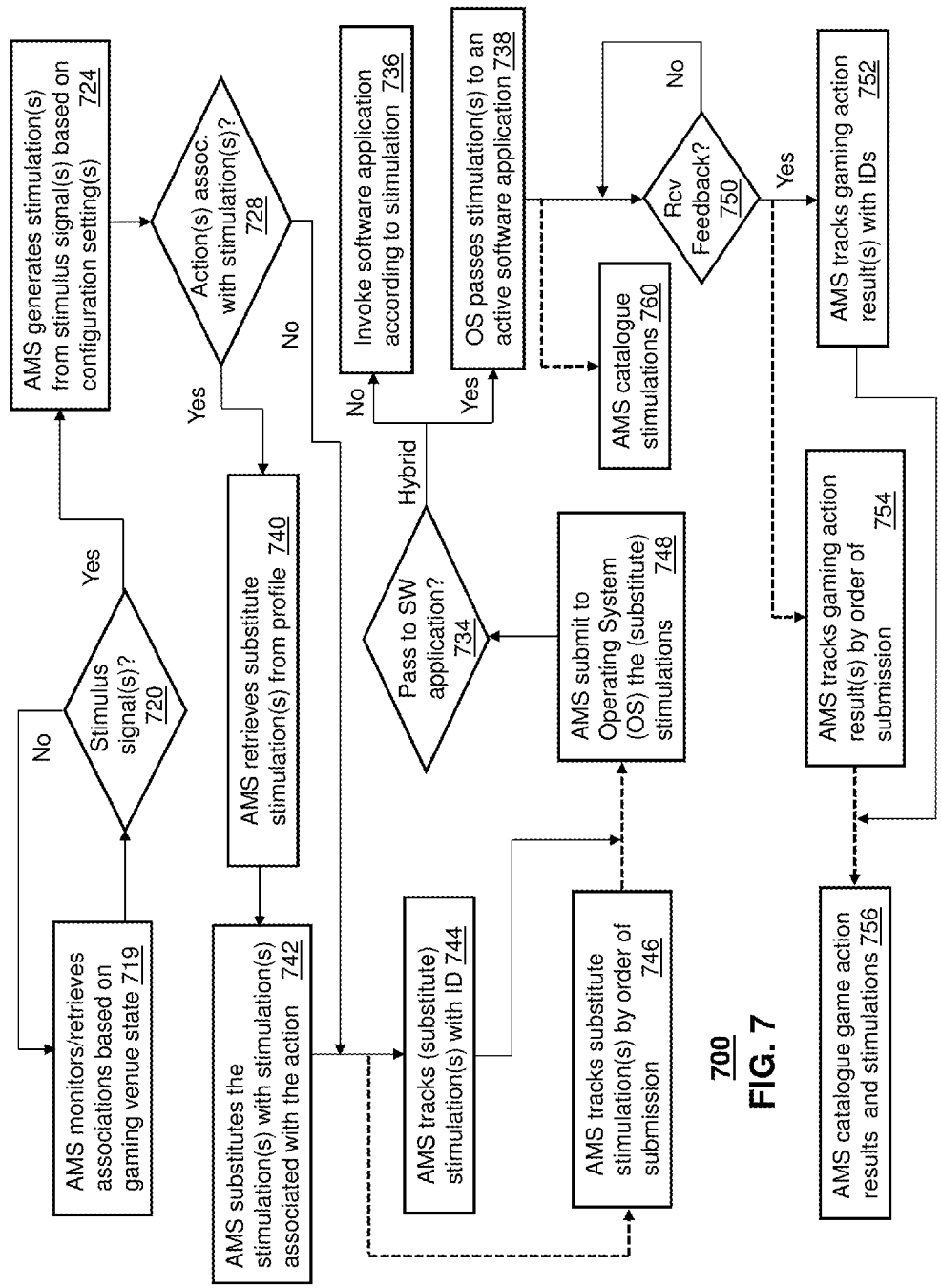

FIGS. 5A and 6-7 depict methods 500-700 which describe illustrative embodiments of the AMS application. Method 500 can begin with step 502 in which the AMS application is invoked in a computing device. The computing device can be a remote server 272, a computer 262, or the gaming console 220 of FIGS. 2A-2B, or any other computing device with suitable computing resources such as a smartphone, a laptop computer, or a tablet as shown in FIG. 3. The invocation step can result from a user selection with a mouse, speech detection, or other navigation and selection approach of the AMS application from a menu or iconic symbol presented on a desktop of the computing device by an operating system (OS) managing operations of the computing device. In step 504, the AMS application can detect by way of drivers in the OS a plurality of operationally distinct accessories communicatively coupled to or an integral part of the computing device. The accessories can be coupled to the computing device by a tethered interface (e.g., USB cable), a wireless interface (e.g., Bluetooth® or WiFi), or combinations thereof. The accessories can also be an integral part of the computing device (e.g., a touch screen display).

In the present context, an accessory can represent any type of device which can be communicatively coupled to the computing device (or an integral part of the computing device) and which can control aspects of the OS and/or a software application executed by the computing device. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1A with operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

Figure 1B:
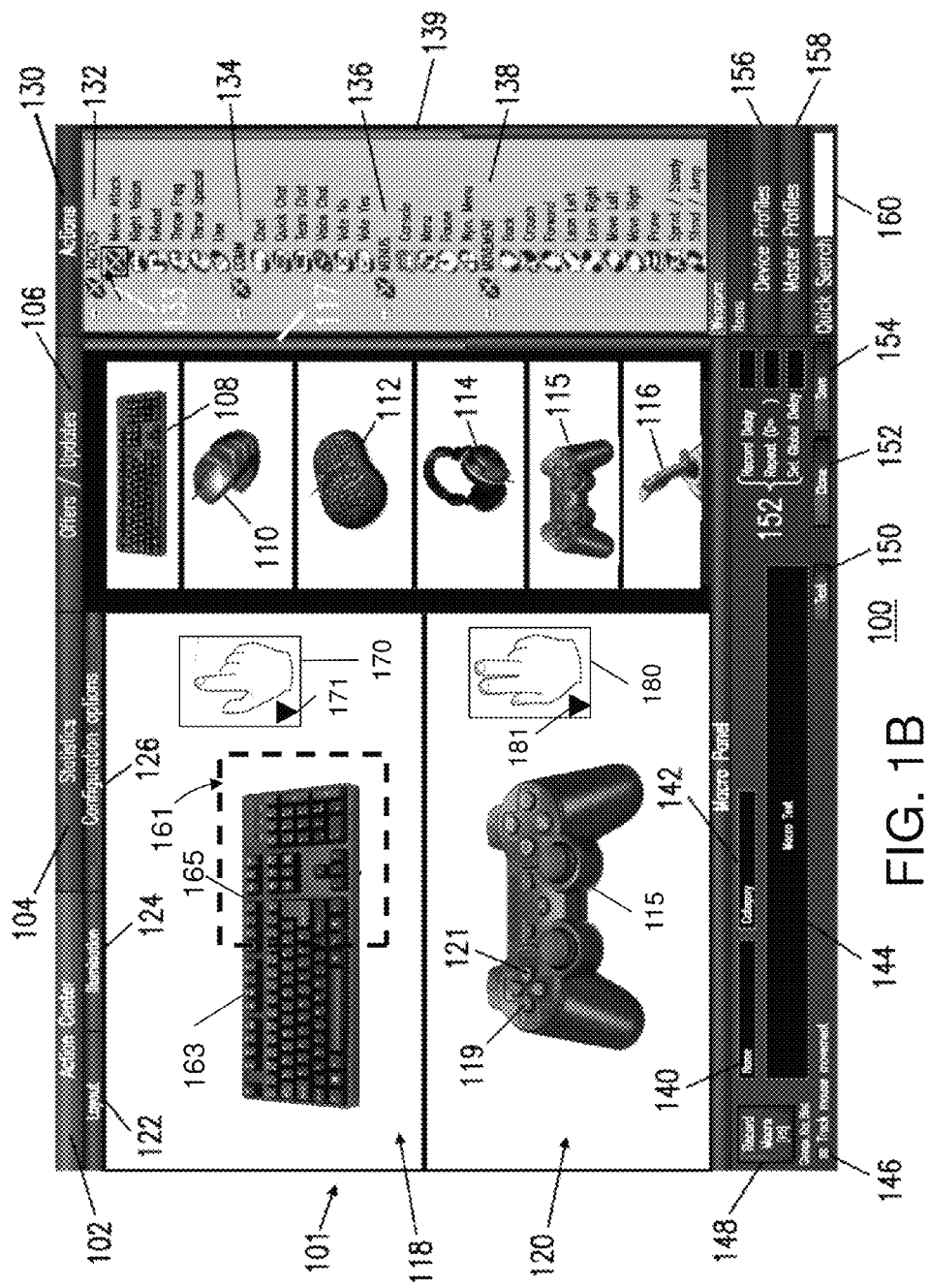

In another embodiment, the AMS application can present GUI 101 with a particular portion (zone) of an accessory selected, as shown in FIG. 1B. In the example shown in FIG. 1B, keyboard 108 has two zones 163, 165, and a boundary 161 is drawn around right-hand zone 165 to indicate the selected zone. Alternatively, the user can select an accessory and then draw boundary 161 with a drawing tool, to select a particular zone of the selected accessory. Different zones of the same accessory can thus be separately customized. For example, different zones of an accessory can be associated with different sets of control gestures, as described in more detail below.

In step 508, the AMS application can be programmed to detect a user-selection of a particular software application such as a game. This step can be the result of the user entering with speech detection or keyboard entries in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

In one embodiment, any one of the actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and dragging the symbol to any of the input functions (e.g., buttons) of the keyboard 108 or selectable options of the gaming controller 115 to make an association with an input function of one of these accessories.

Figure 5C:
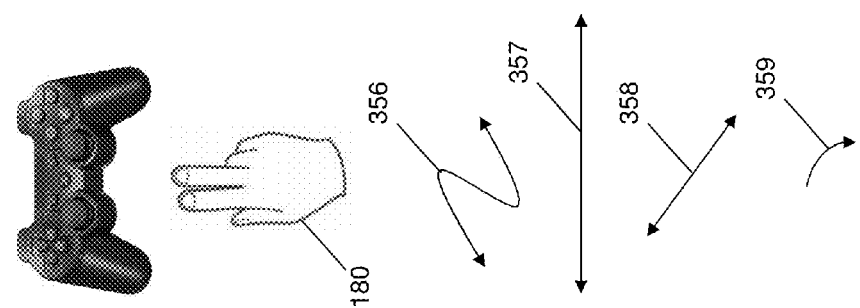
Figure 5B:
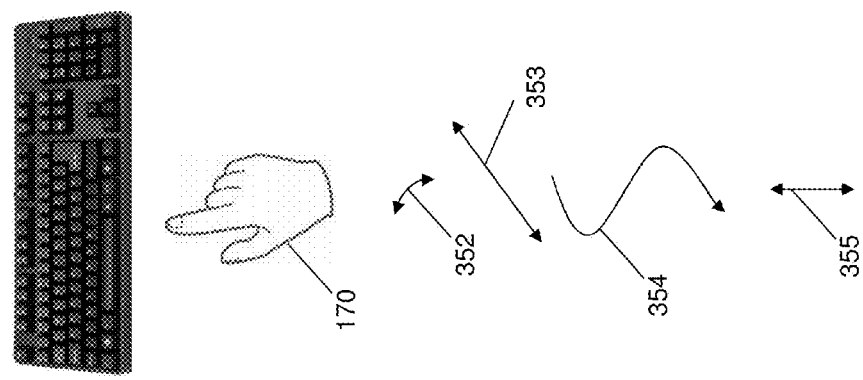
Figure 5G:
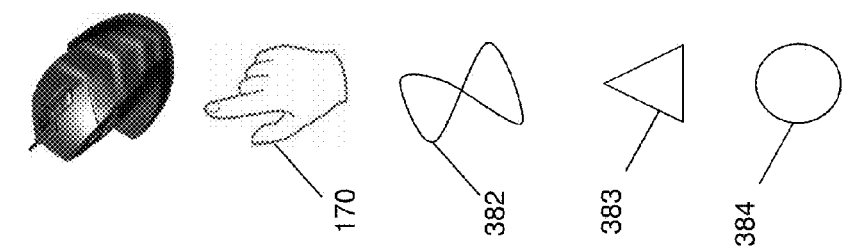
Figure 5F:
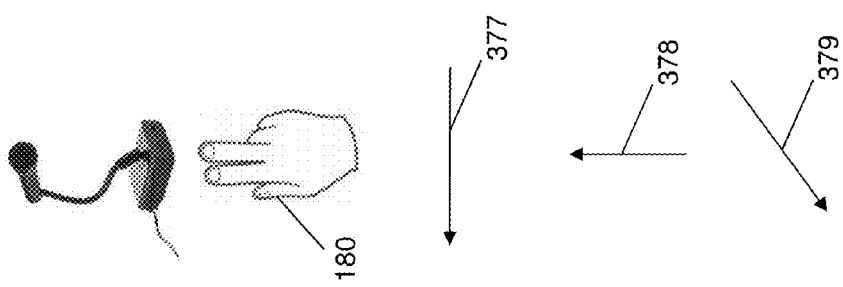
Figure 5E:
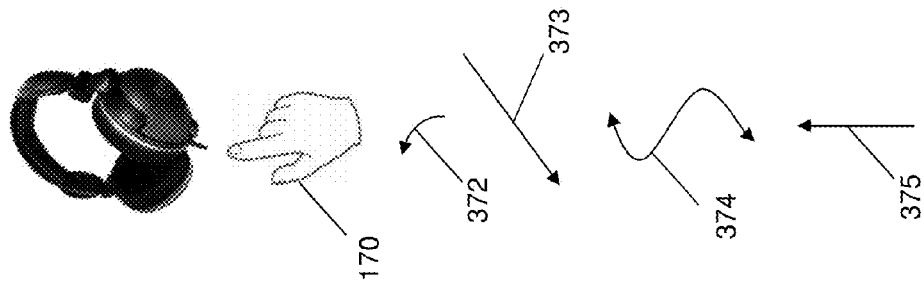

In another embodiment, actions 130 can be associated with gestures detected by a gaming accessory. For example, in window 118 a hand 170 is depicted alongside keyboard 108. The hand symbol 170 also includes a drop-down menu depicted by symbol 171, which is selectable with the mouse pointer 133. The drop-down symbol 171, when selected, can present a list of gestures recorded by the AMS application as a library of gestures associated with the keyboard 108. Illustrations of these gestures are shown in FIG. 5B. For example, a clockwise or counterclockwise turn of a user's hand can represent gesture 352. A diagonal movement of the hand can represent gesture 353, and so on for gestures 354 and 355. The AMS application can be adapted to record gestures 352-355 in a library using the macro recording function described below at step 520.

In a manner similar to the embodiment described earlier, a user can select "Melee Attack" by placing the mouse pointer 133 over the iconic symbol associated with this action. The user can then select the icon by holding the left mouse button and dragging the symbol to the drop-down menu symbol 171, which in turn presents the library of gestures associated with the keyboard 108 as shown in FIG. 5B. While holding the left mouse button, the user can drag the Melee Attack icon over one of gestures 352-355. When the icon overlaps one of the gestures, the AMS application can be adapted to highlight the gesture with color or other suitable highlighting techniques. Once the user locates the gesture of interest, the user can release the left mouse button to initiate the association. The AMS application can in response to releasing the left mouse button automatically make the association, or prompt the user to verify the association ("Select OK if you wish to associate Melee Attack with the highlighted gesture?").

The association of actions 130 can also be performed with the gaming controller 115 based on the hand symbol 180 and corresponding drop-down menu 181. Like the keyboard 108, the gaming controller 115 can have a library of gestures 356-359 as shown in FIG. 5C that can be created by way of the recording function provided by the AMS application. Other accessories such as a display, a headset, a microphone, and a mouse can be adapted with a proximity and/or touch sensor 416 for sensing gestures such as gestures 362-364 of FIG. 5D, gestures 372-375 of FIG. 5E, gestures 377-379 of FIG. 5F, and gestures 382-384 of FIG. 5G, respectively.

It is further noted that the positioning of fingers, and the orientation of the hand can also be used as a means to distinguish between gestures. For instance, the hand symbol 170 shows one (index) finger of the right hand, which is distinguishable from the two fingers of the right hand shown in hand symbol 180 and one (index) finger of the left hand shown in hand symbol 190. In addition, the orientation of hand symbol 190 is distinguishable from the orientation of hand symbols 170 and 180. These distinctions can be used to further identify which gestures are associated with which accessories. It is further noted that such distinctions can be used to form multiple libraries for the same accessory. For example, left hand symbol 190 can be used for a first library of gestures associated with the keyboard 108, and right hand symbol 170 can be used for a second library of gestures associated with the keyboard 108.

Figure 5I:
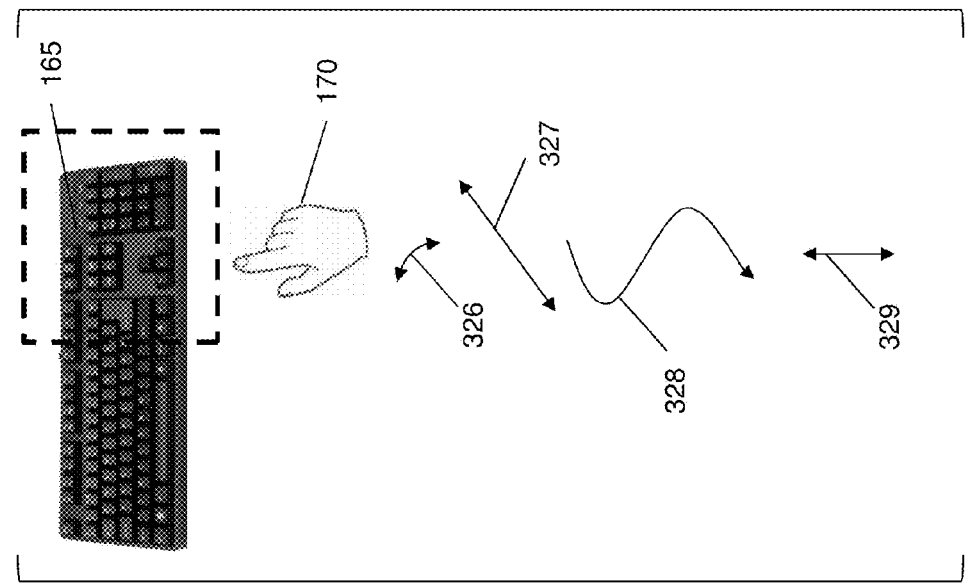
Figure 5H:
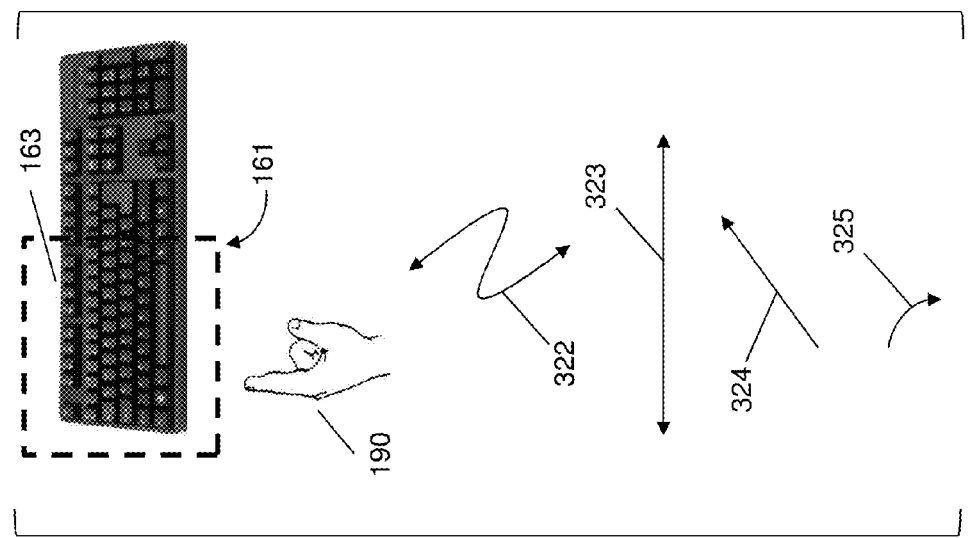

As noted above, an accessory can be adapted with a plurality of sensors 416 in respective zones of the accessory. The user can select an accessory and then select a zone of that accessory to customize with a library of gestures, so that gestures detected by sensors integrated with that zone are associated with a particular action. For example, as shown in FIG. 1B, in window 118 keyboard 108 can be presented with boundary 161 (or the user can draw the boundary on the depicted keyboard) to indicate selection of zone 165 on the right-hand side of keyboard 108, and a right hand 170 is depicted alongside keyboard 108. The hand symbol 170 also includes a drop-down menu depicted by symbol 171, which is selectable with the mouse pointer 133. If a boundary is presented or drawn to indicate zone 163 on the left-hand side of keyboard 108, a left hand can be depicted alongside keyboard 108 with a symbol for different drop-down menu. The drop-down symbol, when selected, can present a list of gestures recorded by the AMS application as a library of gestures associated with the selected zone. Illustrations of these gestures are shown in FIGS. 5H and 5I relating to zones 163 and 165 respectively. For example, a side-to-side movement of the user's left hand can represent gesture 323. A diagonal movement of the right hand can represent gesture 327, and so on for gestures 322-325 (left hand, zone 163) and gestures 326-329 (right hand, zone 165). The AMS application can be adapted to record the gestures in libraries associated with the respective zones, using the macro recording function described below at step 520.

Figure 5K:
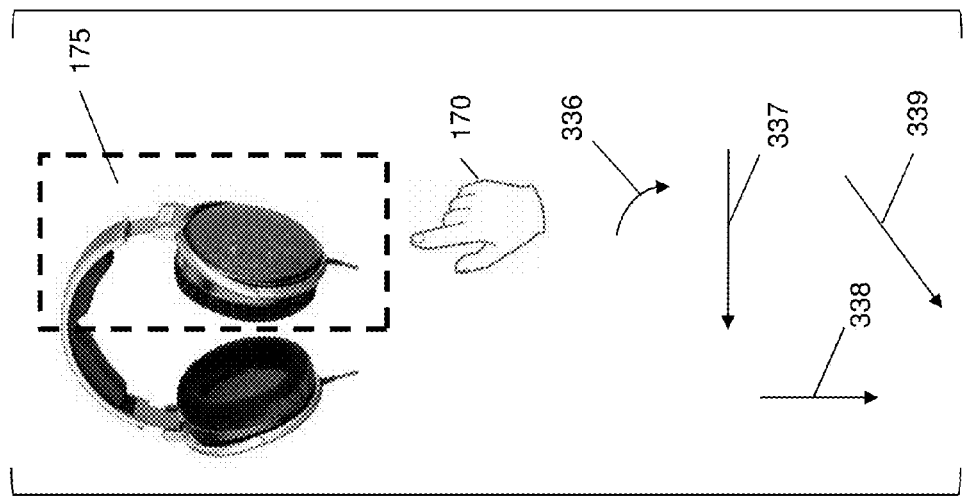
Figure 5J:
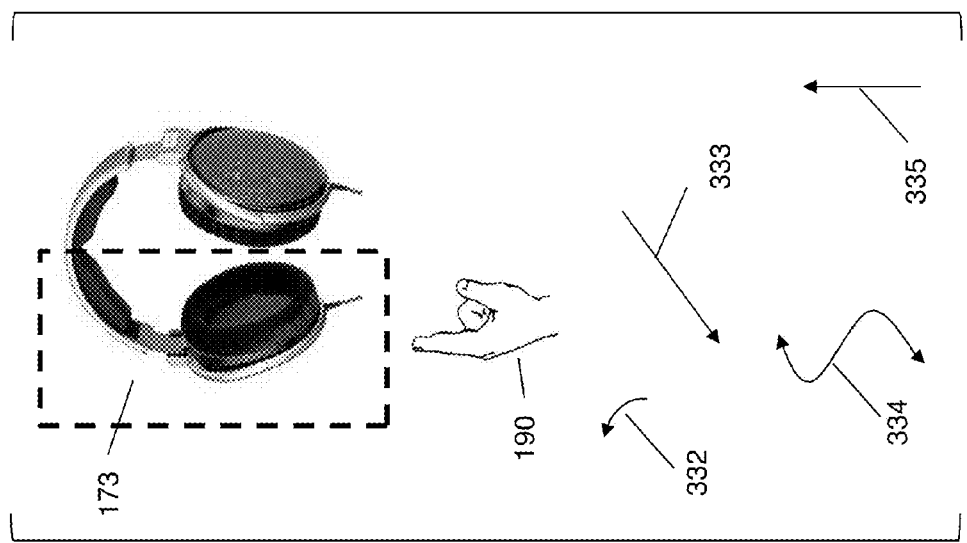

Similarly, headset 114 can be adapted with a plurality of proximity and/or touch sensors 416 at the left and right earpieces respectively, so that the headset can have left and right zones 173, 175. Like the keyboard 108, the zones of the headset can have distinct libraries of gestures, for example gestures 332-335 performed with the left hand on or proximate to zone 173 as shown in FIG. 5J, and gestures 336-339 performed with the right hand on or proximate to zone 175 as shown in FIG. 5K.

Figure 5M:
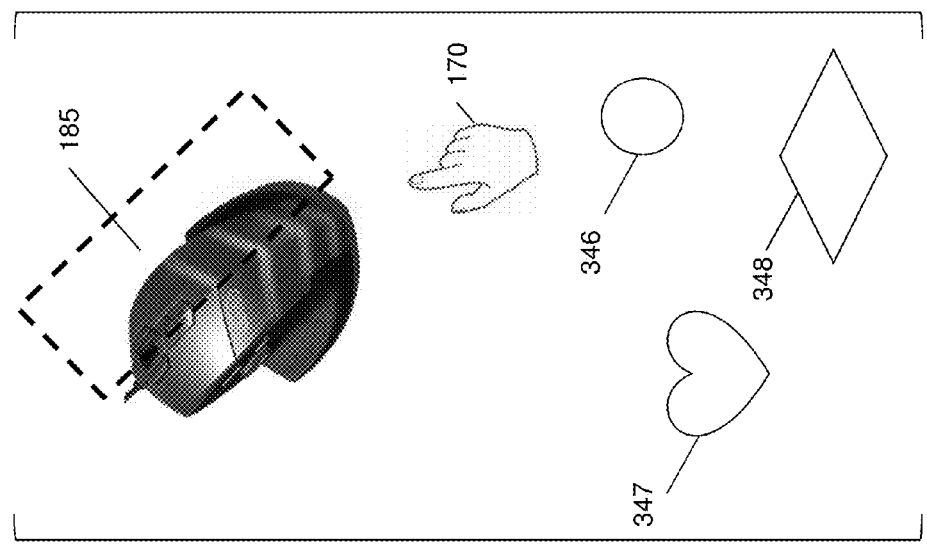
Figure 5L:
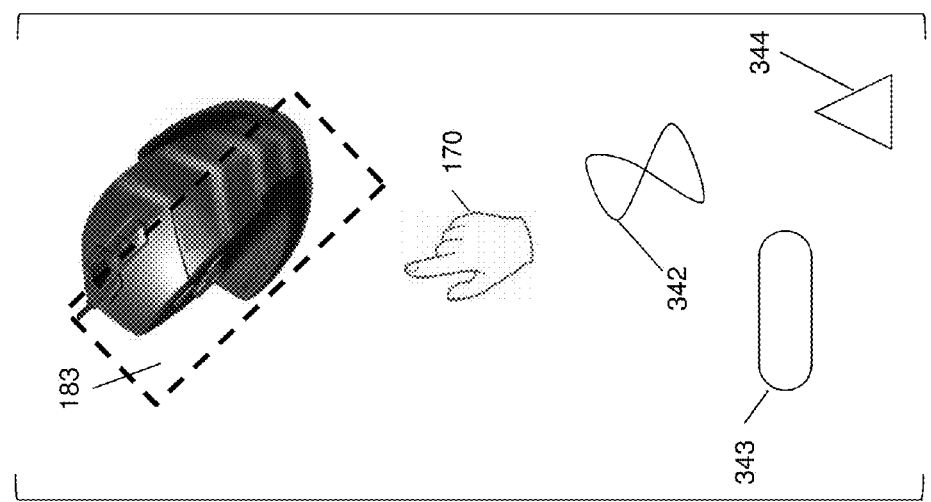

In another example, mouse 110 can be adapted with a plurality of proximity and/or touch sensors at the left and right buttons respectively, so that the mouse can have left and right zones 183, 185. Like the keyboard 108 and headset 114, the zones of the mouse can have distinct libraries of gestures, for example gestures 342-344 performed on or proximate to zone 183 as shown in FIG. 5L, and gestures 346-348 performed on or proximate to zone 185 as shown in FIG. 5M.

It should be noted that accessories can be subdivided into zones whether the zones are physically independent, or are separated by a virtual boundary. An accessory with a continuous surface, for example the surface of keyboard 108, can be subdivided into zones by drawing a virtual boundary using the GUI 101 (see FIG. 1B, wherein boundary 161 is drawn to create distinct zones 163, 165 on the surface). However, the user can also specify physically independent areas of an accessory (such as left and right earpieces of a headset, or left and right buttons of a mouse) as distinct zones, without having to draw a boundary using the GUI. In addition, a specific gesture can be associated with a specific zone (even if that zone is defined only by a virtual boundary), so that the gesture causes an action only when performed in that zone. For example, gesture 322 is in the library of gestures for zone 163 but not for zone 165. Accordingly, gesture 322 will cause an action only when performed on, or proximate to, zone 163 at the left-hand side of keyboard 108 (see FIG. 5H).

It is also noted that touch combinations can also be used for distinguishing between gestures and/or libraries. For instance, a single tap based on hand symbol 170 can trigger one library, while a double tap based on the same hand symbol 170 can trigger a second library. The combination of taps, hand orientation, or finger orientation can provide users multiple options for recording gesture libraries. It is also noted that a gesture library of one accessory can be associated with other accessories, or can be transferred or swapped between accessories. It is also noted that a single gesture can also be transferred or swapped between accessories. It is further noted that gestures can be performed with both hands.

In another embodiment, the actions of one accessory can also be associated with another accessory that is of a different category. For example, gestures, or key depressions of the keyboard 108 can be associated with one of the buttons of the gaming controller 115 (e.g., the left button 119).

Based on the above illustrative associations, when a selected button is depressed, or a gesture is detected by the keyboard 108 or gaming controller 115, the stimulus signal that is generated by the selected button or gesture can be substituted by the AMS application with the selected action (Melee Attack in the above example). In yet another embodiment, the action can be associated with movement of the gaming controller 115 such as, for example, rapid movement, shaking of the gaming controller 115, or a gesture performed with the controller 115 itself.

In a further embodiment, the AMS application can be adapted to make associations with two dimensional or three dimensional movements of the gaming controller 115 or two dimensional or three dimensional gestures according to a gaming venue state. For example, suppose a gamer's avatar enters a fighter jet. In this gaming venue state, moving the left navigation knob of the gaming controller 115 forward can be associated by the AMS application with controlling the throttle of the jet engines. Similarly, hand gestures (of a single hand or both) can be used. For example, one hand over one accessory with proximity sensing can be used to detect throttling of the jet engines, while the other hand over the same or difference accessory can be used to navigate upwards, downwards, bank right, bank left, or perform any other three dimensional maneuvering. In yet another embodiment, rapidly moving the gaming controller 115 downward can represent release of munitions such as a bomb, or a separation of fingers followed by a downward motion of the hand detected by a proximity sensor of the accessory as a gesture can also represent release of munitions.

In a gaming venue state where the gamer's avatar has entered a building, lifting of the gaming controller 115 or a hand (detected by a sensor of the gaming controller 115) above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can associate standard stimuli generated by manipulating a gaming accessory or detecting gestures via the gaming accessory with substitute stimuli that control gaming actions of a video game. The AMS application can be adapted to perform these associations based on a gaming venue state such as the ones described above. Accordingly, the associations made between stimuli supplied by an accessory such as the gaming controller 115 from manipulations of the gaming controller 115 or gestures detected thereby can be venue state dependent. The gaming venue state can be a description of a gaming state (e.g., entering a tank which requires the use of gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

It is also noted that the AMS application can be directed to make associations according to speech commands. For example, a user can state "associate Melee Attack with the letter "A" of the keyboard 108," or "associate Ctrl A of the keyboard 108 with the "X" button of the gaming controller 115", or "associate waving of my left hand with Melee Attack," and so on. The AMS application can use speech recognition technology to parse and process such speech commands to make the requested associations.

At step 512 the AMS application can also respond to a user selection of a profile. A profile can be a device profile or master profile invoked by selecting GUI button 156 or 158, each of which can identify the association of gaming actions with stimuli generated by one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, gestures detected thereby, a combination of actions in the Action section 130, an identification of a software application to be initiated by an operating system (OS), or any other recordable stimulus to initiate, control or manipulate software applications.

For instance, a macro can represent a user entering the identity of a software application (e.g., instant messaging tool) to be initiated by an OS upon the AMS application detecting through speech recognition a speech command. A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the actions 130 menu. Macros can further represent libraries of gestures recorded by the AMS application.

Macros can be created from the GUI 101 by selecting a "Record Macro" button 148. The macro can be given a name and category in user-defined fields 140 and 142. Upon selecting the Record Macro button 148, a macro can be generated by selection of input functions on an accessory (e.g., Ctrl A, speech, gesture, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520.

Step 520 can also be used to record gestures as described earlier. For instance, the user can select the record macro button 148, perform a gesture which is detected by the proximity and/or touch sensor 416 of the accessory device (e.g., keyboard 108), and select the Save button 154 to complete the recording. The user can continue to perform these steps to create a library of gestures for the accessory in question. Gestures can be distinguished not only by two-dimensional movement, but also by the number of fingers detected in proximity to the accessory and/or the number of fingers touching the accessory, as well as three dimensional movement of the hand. It should be noted that gestures are not limited to hands. Gestures can also be based on other body parts such as winking of an eyelid, movement of a user's head, body motion, etc.

Once a macro has been recorded, the recording step can be combined with a step for adding the macro to the associable items actions 130, thereby providing the user the means to associate the macro with input functions of the accessories (e.g., one or more keys of the keyboard 108, buttons of the gaming controller 115, etc.).

In step 522, the AMS application can respond to drag and drop associations of actions and input functions of the keyboard 108 or the gaming controller 115, or associations described by the user's speech. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded and/or stored in the profile in step 526. If a profile has not been identified in step 512, the AMS application can create a profile in step 528 for recording the detected associations. In the same step, the user can name the newly created profile. The newly created profile can also be associated with one or more gaming software applications in step 530 for future reference. The AMS application can also record in a profile in step 526 associations based on gaming venue states. In this embodiment the same stimuli generated by the gaming controller 115 or keyboard 108 can result in different substitutions based on the gaming venue state detected by the AMS application.

The AMS application can also be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and substitute stimuli according to the detected gaming venue state.

Referring back to step 526, once the associations have been recorded in a profile, the AMS application can determine in step 532 which of the accessories shown illustratively in FIG. 1 are programmable and available for programming. If the AMS application detects that the accessories (e.g., keyboard 108, gaming controller 115) are communicatively coupled to a computing device from which the AMS application is operating (e.g., gaming console 220) and programmable, the AMS application can proceed to step 534 of FIG. 5A where it submits the profile and its contents for storage in one of the accessories (e.g., the gaming controller 115 in FIG. 2A). Once the gaming controller 115 is programmed with the profile, it can perform stimuli substitutions according to the associations recorded by the AMS application in the profile. Alternatively, the AMS application can store the profile in a computing device of FIGS. 2A-2B (e.g., gaming console 220 or computer 262) and perform substitutions of stimuli supplied by the gaming controller 115 and/or keyboard 108 according to associations recorded in the profile by the AMS application.

The GUI 101 of FIG. 1 presented by the AMS application can have other functions. For example, the GUI 101 can provide options for layout of the accessory selected (button 122), how the keyboard is illuminated when associations between input functions and actions are made (button 134), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application. Selecting button 106 can also cause the AMS application to adapt the GUI 101 to present promotional offers and software updates.

The steps of method 500 in whole or in part can be repeated until a desirable pattern of associations between stimulus signals generated by accessories and substitute stimuli is achieved. It would be apparent to an artisan with ordinary skill in the art that there can be numerous other approaches to accomplish the embodiments described by method 500 or variants thereof. These undisclosed approaches are contemplated by the subject disclosure.

Method 600 depicts illustrative embodiments for processing user requests based on contextual circumstances. Method 600 can begin, for example, with step 602 where the AMS application monitors a region for gamers. A region can represent a region of communication (wired or wireless), a region of visual identification, or combinations thereof. For example, a region of communication can represent a region where ambient speech can be detected by sensing equipment. In this embodiment, the region may be limited to the audio range of one or more microphones placed about a location of a computing device executing the AMS application. In another embodiment, the region of communication may represent physical access of a gamer to the computing device by way of a user interface such as a keyboard, mouse, fingerprint reader, etc. In yet another embodiment, the region of communication can represent a range of radio frequency communication between a communication device of a gamer and the computing device. For short range communications such as Bluetooth or WiFi, the range may be measured in feet or yards. For long-range communications, such as cellular communications, the range may be limitless. A region of visual identification can represent a region from which image sensors such as cameras coupled to the computing device can detect a presence of a gamer.

At step 604, the AMS application can be configured to detect biometric data of a person within the region being monitored. The biometric data can be an image of the person detected by one or more cameras which is then processed by the AMS application using image processing technology to identify the person according to a known biometric signature of the person. Biometric data can also represent fingerprint data collected by a fingerprint reader coupled to the computing device, a retinal scan performed by an eye sensor coupled to the computing device, a thermal profile of the user detected by thermal sensing equipment coupled to the computing device, or other suitable biometric sensing equipment that can produce biometric data. To determine an identity of the person detected in step 604, the AMS application can compare the biometric data sensed by biometric sensing equipment to pre-recorded biometric signature data of one or more gamers to identify gamers. If a gamer is not identified in step 606 based on the comparison, then the AMS application continues to monitor at step 602 for other gamers.

If, however, a match is detected, the AMS application proceeds to step 610 where it accesses a gaming account of the identified gamer. The gaming account may be locally stored by the AMS application in the computing device, or it may be stored at a remote server that manages gaming accounts for a social network of gamers. At step 612, the AMS application can determine from the gaming account a gaming behavior of the identified gamer. The gaming behavior can comprise data representing behaviors monitored and recorded by the AMS application when the gamer engages in gaming sessions with other gamers. For example, the gaming behavior data can indicate that the identified gamer has played games with a number of other gamers (e.g., 20 gamers) since the AMS application began monitoring the gamer. The gaming behavior data may also identify the most recent games played by the identified gamer, and the most recent gamers that have engaged in a gaming session with the identified gamer. The gaming behavior data can include a time stamp for each gaming session so that the historical data can be sorted. The gaming behavior data can also categorize gamers by type of game (e.g., 3 gamers identified as recently engaging in a WoW game with the identified gamer, another 2 gamers identified as recently engaging in a Call of Duty™ game with the identified gamer, and so on). The gaming behavior data may also include gaming statistics indicating which games the identified gamer performs best, as well as, gaming statistics of other gamers which can be compared to the identified gamer. The statistics of the other gamers can be used, for example, to identify which gamers pose a challenge to the identified gamer.

Based on the gaming behavior data, the AMS application can determine at step 614 a last game played by the identified gamer. The AMS application can in step 616 determine also from the gaming behavior data the most recent gamers that have engaged in games with the identified gamer. In step 618, the AMS application can further determine if any of the recent gamers are available to play with the identified gamer. The AMS application can make this determination by submitting message inquiries by landline or wireless communication interfaces to communication devices of other gamers such as the client devices shown in FIG. 3B, and/or by submitting inquiries to on-line gaming systems such as depicted in FIG. 3B. The inquiries to the communication devices of the other gamers can be directed to a gaming client operating in the communication devices of the other gamers. The gaming client can represent a software application executed by the communication device that monitors gaming activities initiated by the user of the communication device, and thereby can respond to such inquiries without prompting the user of the communication device. Alternatively, the inquiry sent by the AMS application can be presented to a user of the communication device to enable the user to determine whether s/he wants to expose his/her gaming activities to the AMS application. If the gamer is engaged in an on-line gaming session and/or logged in an account of the on-line gaming system, the on-line gaming system receiving the inquiry can respond to the AMS application with an acknowledgment of the gamer's status.

From the responses sent by the communication devices and/or the on-line gaming systems, the AMS application can make a determination whether the gamers are available or busy playing with other gamers. It is noted that the AMS application can also direct the inquiries to one or more presence servers (not shown) that monitor gaming activities associated with the other gamers. Such presence servers may also provide gaming status information to the AMS application.

At step 620, the AMS application can further determine a gaming environment of the gamer. The gaming environment can be determined contextually at the time the gamer was identified at step 606. For example, a time of day when the gamer is detected can be compared to the gaming behavior data to determine what the identified gamer has previously done during a similar period. For instance, the AMS application can determine from the gaming behavior data that the gamer generally engages in a gaming session of Call of Duty™ at or near the time when the gamer was identified in step 606. The AMS application can further assess that the gamer was identified using a tablet as the computing device. Accordingly, the AMS application can determine that Call of Duty™ can be played after invoking a client program tailored for this game. The AMS application can determine from location information provided by a communication device of the gamer (e.g., GPS coordinates) has been detected in a library setting. Based on the location of the gamer, the AMS application can further determine that gaming must be initiated discretely (i.e., speakers of the tablet must be muted).

At step 622, the AMS application can determine whether the gamer identified at step 606 is interested in engaging in a gaming session. This determination can be made by an express action of the identified gamer such as a speech command ("please start a gaming session based on game XXX"). Alternatively, the determination of the gamer's interest may be inferred by gestures, body language, prior behavior, habits, and so on. In one embodiment, the AMS application can bypass step 622 if it is determined that a determination cannot be made with high confidence as to whether the gamer identified in step 606 wishes to engage in a gaming session.

At step 624, the identified gamer can be presented a list of gamers available to engage in a gaming session. The presentation can be based on synthesized speech projected by the AMS application by way of an audio system of the computing device (e.g., "Welcome John. It's good to see you again. I have detected that Sam, Sally, and Joe are available to play Call of Duty™ with you. Would you like to contact them to coordinate a game?"). Alternatively, or in combination, a display device of the computing device can present a list of gamers and status information to indicate what the gamers may be doing at the time the list is presented.

At step 626, the AMS application can detect a response from the identified gamer in the form of speech, gesture, keyboard entry and/or navigation device selection. The response can include an identification of a game type to initiate, and one or more gamers to contact based on the presentation given at step 624. Alternatively, the response can identify a divergent interest of the gamer, which may include an identification of a new game type not consistent with the gaming behavior data, as well as, a request to engage in a gaming session with gamers not identified by the AMS application at step 624. At step 628, the AMS application can select a gaming profile from a group of profiles constructed according to method 500 of FIG. 5A. The selection of the gaming profile can be made according to the gaming environment determined at step 620. In the same step, the AMS application can contact the other garners and inform them that the identified gamer of step 606 has requested a gaming session of game XXX. At step 630, the AMS application can configure the computing device of the identified gamer according to the gaming profile. Once the garners accept the invitation to game with the identified gamer, the AMS application can proceed to step 632 where it facilitates the gaming session with the other garners identified in step 628. The gaming session may be a peer-to-peer gaming session between the computing devices of the garners, or by way of a gaming session coordinated by an on-line gaming system as depicted in FIG. 3B.

It is further noted that method 600 can be adapted to answer any speech inquiries of the gamer associated with gaming. For example, in one embodiment, the gamer can ask the AMS application to connect the gamer to a social network for garners. In this embodiment, the AMS application can process the speech command, retrieve social networking information stored in the gaming account, and connect the gamer to the requested social network. In another embodiment, the gamer can ask the status of other garners not anticipated by the AMS application. In this embodiment, the AMS application can submit inquiries to client devices, on-line gaming systems, or presence servers for status information about the garners. The AMS application can also apply contextual analysis to such inquiries. For example, the AMS application can determine a location of the gamer, a time of the inquiry, and assess a proper response to an inquiry. For instance, if the gamer is in one time zone, the AMS application can analyze whether gaming with other garners in a different time zone may pose problems for engaging in a gaming session that may last more than an hour. For example, if the garners are teenagers, and parental controls prevent gaming after a certain time, which may be known to the AMS application, then under such circumstances the AMS application can inform the gamer that these garners may have a limited playing time, and/or suggest other garners that may not be subject to parental controls or are in a similar time zone.

Once the gaming profile and its contents have been identified as described in step 628 of method 600, and the gaming session has started at step 632, the AMS application can proceed to step 719 of FIG. 7 where it monitors for a change in a gaming venue state based on the presentations made by the gaming application initiated between the gainers, or by way of API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. Additionally, the AMS application can detected gestures performed by the gamer near or upon the gaming controller 115 which can be used to navigate or control weapons of the tank. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank.

A three dimensional lift of the gaming controller 115 can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration. Gestures detected by the gaming controller 115 can also control the tank and/or its weapon systems according to substitute stimuli associated with particular gestures recorded by the AMS application.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Alternatively, or in combination, gestures can control navigation of the avatar and/or use of weaponry. Once the gaming venue state is detected in step 719, the AMS application retrieves the associations related to the venue state, and can perform substitutions of stimuli generated by the gaming controller 115 by way of its controls or detected gestures, and/or based on speech commands received by a microphone of the headset 114.

The AMS application can monitor in step 720 stimulus signals generated by the accessories coupled to the gaming console 220. The stimulus signals can be generated by the gamer by manipulating the gaming controller 115 or gestures detected thereby, and/or by generating speech commands detected by the headset 114.

If stimulus signals are detected at step 720, then the AMS application can generate stimulations from the stimulus signals based upon configuration settings in step 724. In one embodiment, the configuration settings can establish a responsiveness of the AMS application to changes in a stimulus signal of an accessory device. For example, a configuration setting can determine a speed of response to a movement of the gaming controller 115. When the gaming controller 115 is moved in space, digital data is generated indicating a direction and distance of movement relative to a former position. A polling algorithm in the AMS application can read the output data of the gaming controller 115 at periodic intervals to determine if the gaming controller 115 position has changed and, if so, the direction and magnitude of this change.

In several embodiments, one or more configuration settings can be assigned and stored in the AMS application to control responsiveness, resolution, speed, feedback, and/or sensitivity of one or more accessory devices being used to control a game. For example, one or more configuration settings can be defined for counts per inch (CPI) for movement of an input device, frames per second (FPS) and/or dots per inch (DPI) for a display device, inches per second (IPS) for speed and acceleration of an input device, lift distance for a three-dimensional input device, polling rate, feedback intensity, scrolling and/or double-click speed, direction sensitivity and/or window pointer speed for an input device.

The configuration settings can allow the player to configure the accessory device performance to fit the player's style and preferences and can be maintained in a player profile. In one embodiment, the configuration settings can have a default configuration that is established by the AMS application and/or by add-in applications and/or set-up data associated with each accessory device. In one embodiment, the AMS application converts each stimulus signal from each communicating accessory device into a stimulation signal based on the current configuration settings.

In step 728, the AMS application can determine whether to forward the stimulations generated by the accessory to an Operating System (OS) of the gaming console 220 without substitutions. This determination can be made by comparing the stimulations to an association in the profile. If the stimulations match the associations, then the AMS application proceeds to step 740 where it retrieves substitute stimulations in the profile. In step 742, the AMS application can substitute the stimulations with the substitute stimulations in the profile. In one embodiment, the AMS application can track in step 744 the substitute stimulations by updating these stimulations with a unique identifier such as a globally unique identifier (GUID). In this embodiment, the AMS application can also add a time stamp to each substituted stimulation to track when the substitution was performed.

In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Once the stimulations received in step 720 have been substituted with other stimulations in step 742, and the AMS application has chosen a proper tracking methodology for correlating gaming action results with stimulations, the AMS application can proceed to step 748 and submit the substitute stimulations to the OS of the gaming console 220. If in step 722 the detected stimulation(s) do not match an association in the profile, then the AMS application proceeds to one of steps 744 or 746 in order to track the stimulations of the accessory. Once the AMS application has performed the necessary steps to track the stimulation as originally generated by the accessory, the AMS application proceeds to step 748 where it submits stimulations (with or without substitutions) to the OS of the gaming console 220 with or without tracking information as previously described.

In step 734, the OS determines whether to invoke in step 736 a software application identified in the stimulation(s) (e.g., gamer says "turn on team chat", which invokes a chat application), whether to forward the received stimulations (or substitute stimulations generated thereby) to the gaming software application in step 738, or combinations thereof. Contemporaneous to the embodiments described above, the AMS application can monitor in step 750 for game action results supplied by the gaming application via a defined API. The game action results can be messages sent by the gaming application by way of the API of the gaming application to inform the AMS application what has happened as a result of the stimulations sent in step 738. For instance, suppose the stimulation sent to the gaming application in step 738 is a command to shoot a pistol. The gaming application can determine that the shot fired resulted in a miss of a target. The gaming application can respond with a message which is submitted by way of the API to the AMS application that indicates the shot fired resulted in a miss. If IDs such as GUIDs were sent with each stimulation, then the gaming application can submit game action results with their corresponding GUID to enable the AMS application to correlate the gaming action results with stimulations having the same GUID.

For example, if the command to shoot included the ID "1234", then the game action result indicating a miss will include the ID "1234", which the AMS application can use in step 752 to identify the stimulation having the same ID. If on other hand, the order of game action results can be maintained consistent with the order of the stimulations, then the AMS application can correlate in step 754 stimulations with game action results by the order in which stimulation were submitted and the order in which game action results were received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 8:
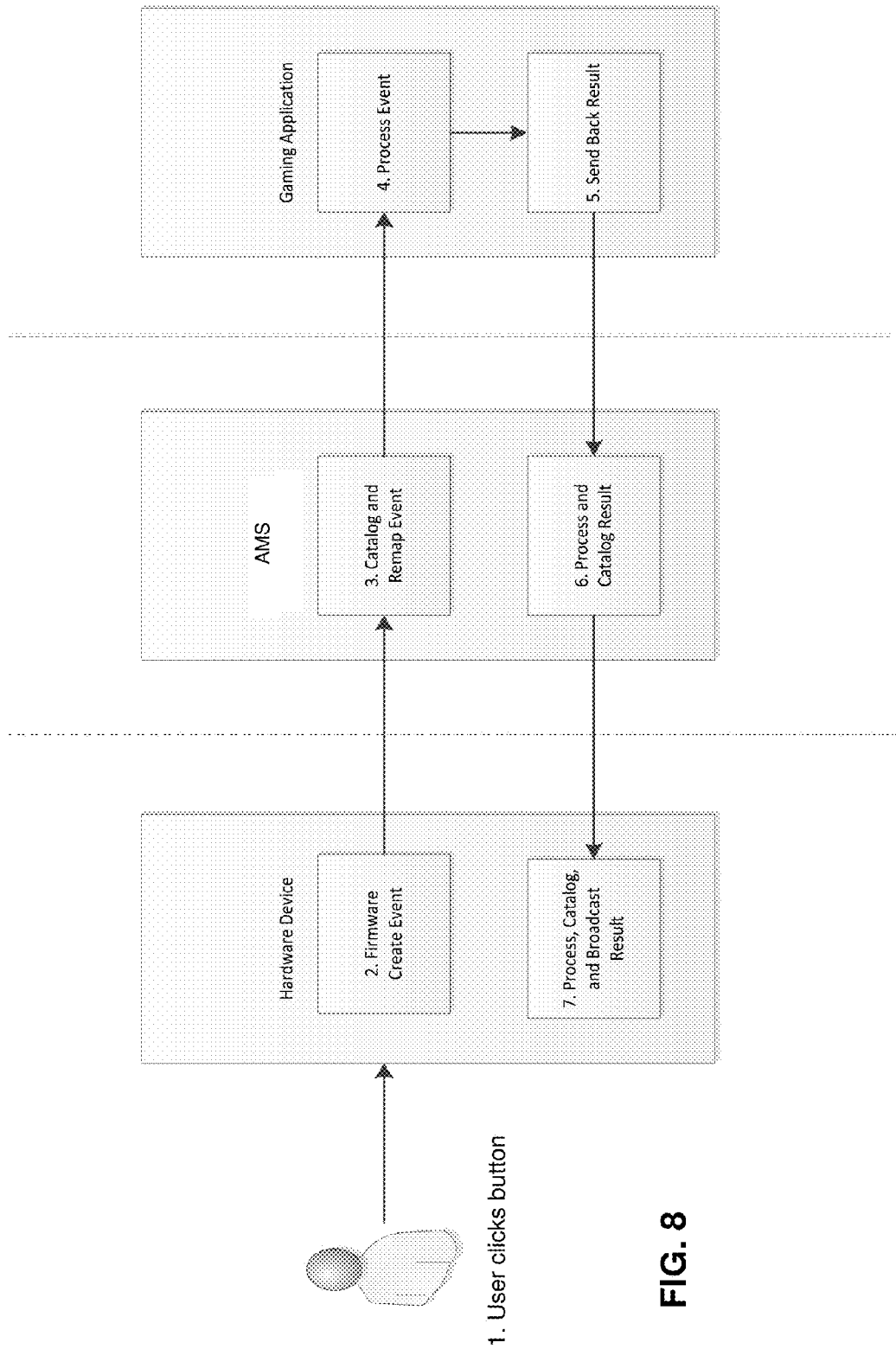
FIGS. 8-9 depicts illustrative embodiments of communication flow diagrams utilized by the AMS application.
Figure 9:
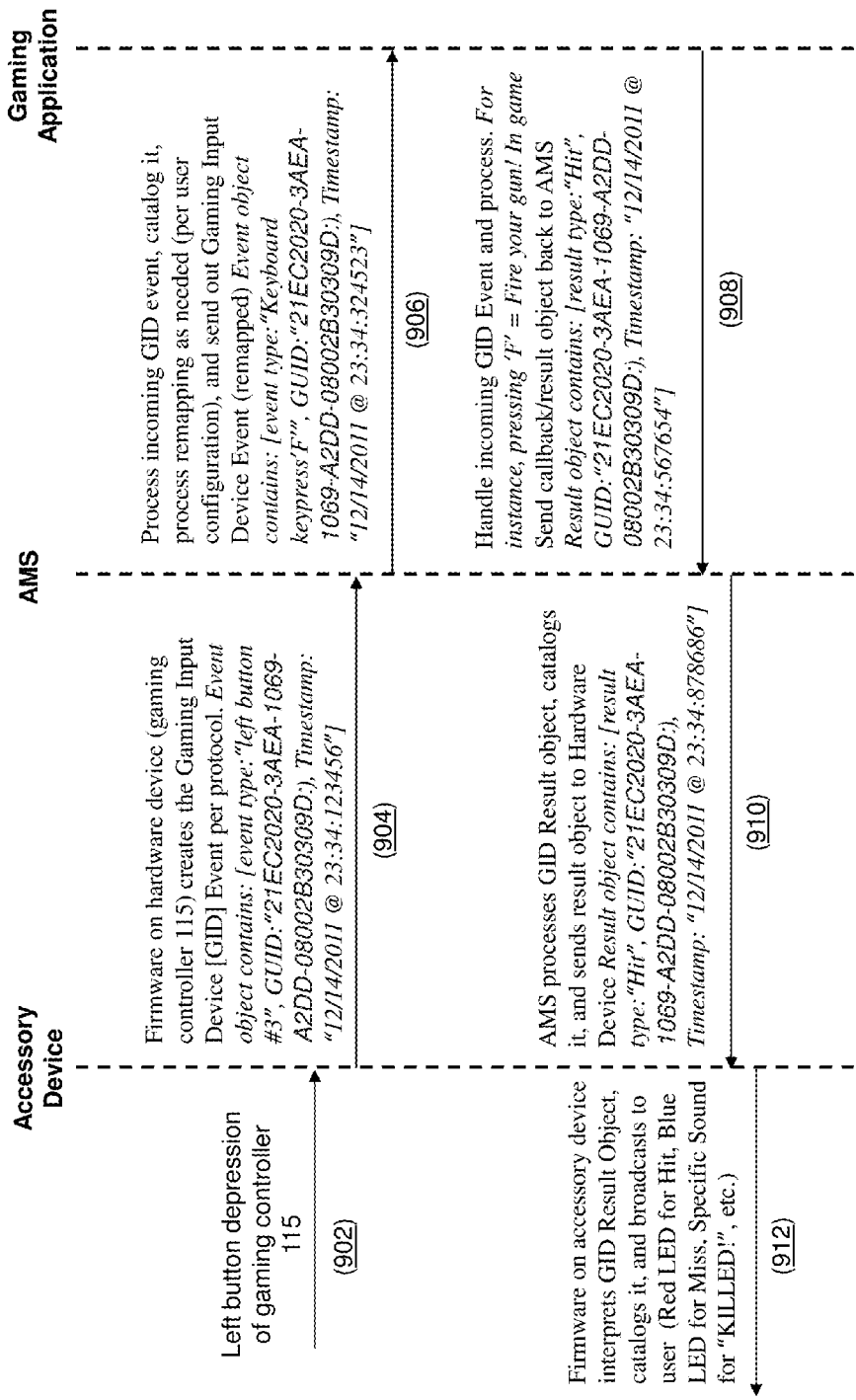

FIGS. 8-9 illustrate embodiments of a system with a corresponding communication flow diagram for correlating stimulations and gaming action results. In this illustration a user clicks a left button of a gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application can catalogue event 3, and, if a substitute stimulation has been predefined, can remap the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 can process the "Hit" by asserting a red LED on the accessory (e.g., left button illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

In an embodiment where the AMS application receives gaming results from a gaming application via an API as described above, the communication flow diagram shown in FIG. 9 can be modified with a more comprehensive protocol that includes a weapon type being monitored, misses, non-kill hits (i.e., a hit that does not result in a kill), kill hits, and loss of life rate.

The AMS application can present performance factors of each gamer, and the type of weapons being tracked (e.g., sniper rifle, machine gun, hand gun) as shown in FIGS. 10-11. To identify which weapon is being used at any point in time during a gaming session, the AMS application can highlight the weapon in a distinguishable color such as blue while keeping all other weapon rows in gray. The AMS application can calculate an average hit rate from the misses, non-kill hits, and kill hits. The AMS application can compare gaming action results between the gamers to identifying leading performance factors as shown in the "Comp Rating" column of each player. In a tournament setting, the performance factors shown in FIGS. 10 and 11 can be shown in side-by-side monitors, or together in a JumboTron™ display such as those used in sporting events or the like.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115. To further enhance the experience for the audience, the gamer's image can be shown as a video clip during the competition. The AMS application can also be adapted to present a portion of the video game associated with each gamer as shown in FIGS. 9-11.

The methods of FIGS. 5-7 can be adapted to operate in whole or in part in a gaming accessory, in an operating system of a computer, in a gaming console, in a gaming application that generates the video game, in a dongle, or any other suitable software application and/or device. The method of FIGS. 5-7 can be adapted to ignore or filter game action results, which may not be relevant to the gamer or analysts. For instance, the AMS application can be adapted to ignore (or filter) game action results relating to navigation of the avatar (e.g., turn around, jump, etc.). The AMS application can also be adapted to ignore (or filter) game action results relating to preparatory actions such as reloading a gun, switching between weapons, and so on. In another embodiment, the AMS application can be adapted to selectively monitor only particular game result actions such as misses, non-kill hits, kills, and life of the avatar. The AMS application can also be adapted to monitor gaming action results with or without temporal data associated with the stimuli and game action results.

In one embodiment, the AMS application can be adapted to track stimuli (or substitutions thereof) by submission order, and order of gaming action results supplied by the gaming application, and perform cataloguing thereof by the respective order of stimuli and gaming action results. The items can be catalogued by the AMS application with or without temporal data.

In one embodiment, the AMS application can be adapted to collect gaming action results for "all" or a substantial portion of stimuli (or substitutions thereof) transmitted to the gaming application. In this embodiment, the AMS application can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In one embodiment, the AMS application can be implemented as a distributed system (e.g., one or more servers executing one or more virtual machines) enabling multiples users to control aspects of the AMS application. For example, in a tournament setting, gaming analysts having access to the AMS application can request a replay of portions of the game to demonstrate exceptional plays versus missed plays at a JumboTron™ display. The gamers can access the AMS application to establish new substitute stimuli, perform calibrations on macros, or invoke or create additional gaming profiles. Portions of the AMS application can also be implemented by equipment of unaffiliated parties or service providers of gaming services.

In one embodiment, the AMS application can be adapted to substitute an accessory stimulus (or stimuli) with a macro comprising a combination of substitute stimuli, and to track the macro when gaming action results are received from the gaming application—rather than tracking each individual substitute stimulus of the macro. The AMS application can be adapted to monitor macros by tracking an order of stimuli (or substitutes) associated with the macro that are transmitted to the gaming application and by tracking an order of gaming action results received from the gaming application, which are associated with the macro. Alternatively, or in combination the AMS application can add a unique identifier to the substitute stimuli to identify the stimuli as being associated with the macro.

The AMS application can be adapted to catalogue the gaming action results associated with the macro in a manner that allows the gamer to identify a group of gaming action results as being associated with the macro. The AMS application can also be adapted to collect sufficient data to assess each individual gaming action result of the macro (e.g., temporal data, hits, misses, etc.). The presentation of catalogued macro data can be hierarchical. For example, the AMS application can present a particular macro by way of a high level GUI that indicates the macro caused a kill. The AMS application can be adapted to enable the gamer to select a different GUI that enables the user to visualize a gaming action result for each stimulus of the macro to determine how effective the macro was in performing the kill, and whether further adjustments of the macro might improve the gamer's performance.

In one embodiment, the AMS application can be adapted to present more or less competitive information than is shown in FIGS. 10-11. In one embodiment, for example, the AMS application can be adapted to present competitive information without the virtual peripherals. In one example, the AMS application can be adapted to present scrollable pages of competitive information with or without the virtual peripherals. In another illustration, the AMS application can be adapted to present competitive information without a viewing of the game or the gamer. Other variants of presenting competitive information or other data shown in FIGS. 10-11 are contemplated by the subject disclosure.

The foregoing embodiments are a subset of possible embodiments contemplated by the subject disclosure. Other suitable modifications can be applied to the subject disclosure.

Figure 12:
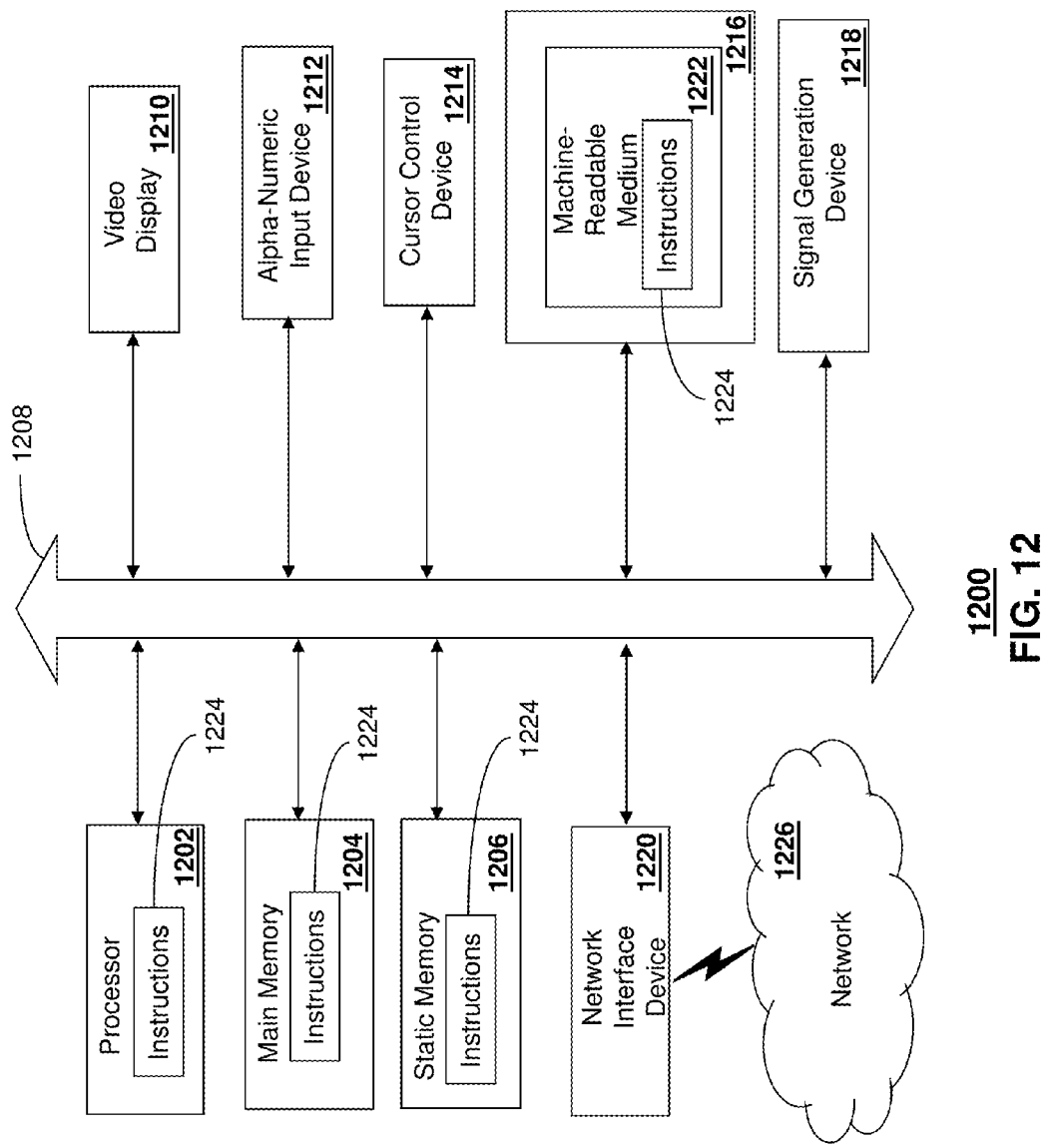
FIG. 12 depicts an illustrative diagrammatic representation of a machine in the form of a computer system within which a set of instructions, when executed, may cause the machine to perform any one or more of the methodologies disclosed herein.

FIG. 12 depicts an exemplary diagrammatic representation of a machine in the form of a computer system 1200 within which a set of instructions, when executed, may cause the machine to perform any one or more of the methods discussed above. One or more instances of the machine can operate as any of devices depicted in FIGS. 1-3, and FIG. 12. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor 1202 (e.g., a central processing unit (CPU), a graphics processing unit (GPU, or both), a main memory 1204 and a static memory 1206, which communicate with each other via a bus 1208. The computer system 1200 may further include a video display unit 1210 (e.g., a liquid crystal display (LCD), a flat panel, or a solid state display. The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220.

The disk drive unit 1216 may include a tangible machine-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible machine-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible machine-readable storage medium 1222 is shown in an example embodiment to be a single medium, the term "tangible machine-readable storage medium" should be taken to include a single medium or multiple media (e.g., a centralized or distributed database, and/or associated caches and servers) that store the one or more sets of instructions. The term "tangible machine-readable storage medium" shall also be taken to include any non-transitory medium that is capable of storing or encoding a set of instructions for execution by the machine and that cause the machine to perform any one or more of the methods of the subject disclosure.

The term "tangible machine-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible machine-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a memory to store instructions; and
a processing system including a processor coupled to the memory and coupled to near field sensors, wherein execution of the instructions by the processor causes the processor to perform operations comprising:
receiving an input via a graphical user interface to define a plurality of zones based on a depiction of an accessory, wherein the input is received from a user of the accessory, wherein the input defines a virtual boundary between zones of the plurality of zones, wherein the virtual boundary is drawn by the user with respect to a depiction of a continuous surface of the accessory, wherein each zone of the plurality of zones corresponds to a portion of the accessory and a space proximate to the accessory comprising one of the near field sensors, and wherein, for each zone, the near field sensor detects objects in the space proximate to the portion of the accessory corresponding to that zone;
detecting a gesture of an object in one of the plurality of zones associated with the accessory by sensing the object with the near field sensor corresponding to the zone;
determining that the gesture is a new gesture not previously associated with the zone and not previously associated with a gaming action of a plurality of gaming actions that control presentations produced by a gaming application resulting in a determination, the gaming application comprising a video game;
associating the gesture with the zone and with the gaming action responsive to the determination;
subsequently detecting the gesture in the zone associated with the accessory with the near field sensor corresponding to the zone;
obtaining the gaming action associated with the gesture responsive to detecting the gesture; and
transmitting the gaming action to the gaming application.

2. The system of claim 1, wherein the accessory comprises a keyboard, a headset, a mouse, a joystick, a display, a gaming controller, a microphone, a camera, or a combination thereof.

3. The system of claim 1, wherein the gaming action performs controlling actions of an animated object presented by the gaming application, initiating execution of a software application independent of the gaming application, or any combination thereof.

4. The system of claim 1, wherein the video game comprises a multiplayer online game.

5. The system of claim 1, wherein the object makes physical contact with the portion of the accessory in the zone.

6. The system of claim 1, wherein the object is in a vicinity of the portion of the accessory in the zone without making physical contact with the accessory.

7. The system of claim 1, wherein the object comprises a body part of a user.

8. The system of claim 7,
wherein the body part is a left hand or a right hand,
wherein the accessory is associated with a first zone of the plurality of zones corresponding to a first portion of the accessory and associated with a second zone of the plurality of zones corresponding to a second portion of the accessory,
wherein the first zone has associated therewith a first set of gestures performed using the left hand, and
wherein the second zone has associated therewith a second set of gestures performed using the right hand.

9. A method, comprising:
receiving, by an accessory comprising a processor coupled to near field sensors, input via a graphical user interface to define a plurality of zones based on a depiction of the accessory, wherein the input is received from a user of the accessory, wherein the input defines a virtual boundary between zones of the plurality of zones, wherein the virtual boundary is drawn by the user with respect to a depiction of a continuous surface of the accessory, wherein each zone of the plurality of zones corresponds to a portion of the accessory and a space proximate to the accessory comprising one of the near field sensors, and wherein, for each zone, the near field sensor detects objects in the space proximate to the portion of the accessory corresponding to that zone;
sensing, by the accessory, a gesture performed by an object in one of the plurality of zones associated with the accessory, wherein the object is detected by the near field sensor corresponding to the zone;
determining, by the accessory, that when the gesture is sensed in the zone associated with the accessory by the near field sensor corresponding to the zone, the gesture is associated with a gaming action that controls presentations produced by a gaming application, the gaming application comprising a video game;
obtaining, by the accessory, the gaming action associated with the gesture responsive to sensing the gesture; and
transmitting, by the accessory, the gaming action to the gaming application.

10. The method of claim 9, further comprising:
associating, by the accessory, the gesture with the gaming action responsive to determining that the gesture is a new gesture not previously associated with the zone and not previously associated with any gaming action; and sensing, by the accessory, a subsequent instance of the gesture.

11. The method of claim 9, wherein the gesture is associated with the zone and with the gaming action responsive to receiving the input from the user.

12. The method of claim 9, wherein the accessory comprises a keyboard, a headset, a mouse, a joystick, a display, a gaming controller, a microphone, a camera, or any combination thereof.

13. The method of claim 9, wherein the gaming action performs controlling actions of an animated object presented by gaming application, initiating execution of a software application independent of the gaming application, or a combination thereof.

14. The method of claim 9,
wherein the object is a left hand or a right hand,
wherein the accessory is associated with a first zone of the plurality of zones corresponding to a first portion of the accessory and associated with a second zone of the plurality of zones corresponding to a second portion of the accessory,
wherein the first zone has associated therewith a first set of gestures performed using the left hand, and
wherein the second zone has associated therewith a second set of gestures performed using the right hand.

15. A non-transitory machine-readable storage device comprising instructions which, when executed by a processing system including a processor, cause the processor to perform operations comprising:
receiving, by an accessory comprising the processor coupled to near field sensors, input via a graphical user interface to define a plurality of zones based on a depiction of the accessory, wherein the input is received from a user of the accessory, wherein the input defines a virtual boundary between zones of the plurality of zones, wherein the virtual boundary is drawn by the user with respect to a depiction of a continuous surface of the accessory, wherein each zone of the plurality of zones corresponds to a portion of the accessory and a space proximate to the accessory comprising one of the near field sensors, and wherein, for each zone, the near field sensor detects objects in the space proximate to the portion of the accessory corresponding to that zone;

sensing a gesture performed by an object in one of the plurality of zones associated with the accessory, wherein the object is detected by the near field sensor corresponding to the zone;

associating the gesture with a gaming action that controls presentations produced by a gaming application, the gaming application comprising a video game;

sensing by way of the near field sensor a subsequent instance of the gesture in the zone while ignoring actions by the object outside of the plurality of zones;

obtaining the gaming action associated with the gesture responsive to detecting the subsequent instance of the gesture in the zone; and providing the gaming action to the gaming application.

16. The non-transitory machine-readable storage device of claim 15, wherein each zone corresponds to a different portion of the accessory.

17. The non-transitory machine-readable storage device of claim 15, wherein the accessory comprises a keyboard, a headset, a mouse, a joystick, a display, a gaming controller, or a combination thereof.

18. The non-transitory machine-readable storage device of claim 15, wherein the gaming action performs controlling actions of an animated object presented by the gaming application, initiating execution of a software application independent of the gaming application, or a combination thereof.

* * * * *